(12) United States Patent
Guo et al.

(10) Patent No.: US 11,560,329 B1
(45) Date of Patent: Jan. 24, 2023

(54) COLORED GLASS ARTICLES HAVING IMPROVED MECHANICAL DURABILITY

(71) Applicant: CORNING INCORPORATED, Corning, NY (US)

(72) Inventors: Xiaoju Guo, Pittsford, NY (US); Jill Marie Hall, Elmira, NY (US); Karl William Koch, III, Elmira, NY (US); Jesse Kohl, Horseheads, NY (US); Jian Luo, Painted Post, NY (US); Liping Xiong Smith, Painted Post, NY (US); Nicole Taylor Wiles, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/677,375

(22) Filed: Feb. 22, 2022

Related U.S. Application Data

(60) Provisional application No. 63/251,785, filed on Oct. 4, 2021.

(51) Int. Cl.
*B32B 15/04* (2006.01)
*B32B 17/06* (2006.01)
*C03C 3/093* (2006.01)
*C03C 21/00* (2006.01)
*C03C 4/02* (2006.01)

(52) U.S. Cl.
CPC ............... *C03C 3/093* (2013.01); *C03C 4/02* (2013.01); *C03C 21/002* (2013.01)

(58) Field of Classification Search
CPC ....................................................... C03C 3/093
USPC ......................................................... 428/426
See application file for complete search history.

(56) References Cited

U.S. PATENT DOCUMENTS

| | | | |
|---|---|---|---|
| 8,232,218 B2 * | 7/2012 | Dejneka | C03B 27/04 501/68 |
| 9,790,124 B2 * | 10/2017 | Dejneka | C03C 4/02 |
| 10,246,371 B1 * | 4/2019 | Dejneka | C03C 3/097 |
| 10,656,454 B2 | 5/2020 | Bazemore et al. | |
| 11,059,739 B2 | 7/2021 | Wolfinger et al. | |
| 11,072,557 B2 | 7/2021 | Weiss et al. | |
| 11,267,748 B2 | 3/2022 | Siebers et al. | |

(Continued)

FOREIGN PATENT DOCUMENTS

WO 2013/099994 A1 7/2013

*Primary Examiner* — Lauren R Colgan
(74) *Attorney, Agent, or Firm* — Russell S. Magaziner

(57) ABSTRACT

A colored glass article includes greater than or equal to 50 mol % and less than or equal to 80 mol % $SiO_2$; greater than or equal to 7 mol % and less than or equal to 25 mol % $Al_2O_3$; greater than or equal to 1 mol % and less than or equal to 15 mol % $B_2O_3$; greater than or equal to 5 mol % and less than or equal to 20 mol % $Li_2O$; greater than or equal to 0.5 mol % and less than or equal to 15 mol % $Na_2O$; greater than 0 mol % and less than or equal to 1 mol % $K_2O$; and greater than or equal to $1\times10^{-6}$ mol % and less than or equal to 1 mol % Au. $R_2O—Al_2O_3$ is greater than or equal to −5 mol % and less than or equal to 7 mol %, $R_2O$ being the sum of $Li_2O$, $Na_2O$, and $K_2O$.

20 Claims, 2 Drawing Sheets

(56) References Cited

U.S. PATENT DOCUMENTS

| | | |
|---|---|---|
| 2013/0128434 A1 | 5/2013 | Yamamoto et al. |
| 2013/0136909 A1* | 5/2013 | Mauro .................. C03C 21/002 |
| | | 428/220 |
| 2014/0066285 A1 | 3/2014 | Beall et al. |
| 2014/0087194 A1 | 3/2014 | Dejneka et al. |
| 2014/0243183 A1 | 8/2014 | Beall et al. |
| 2014/0285956 A1 | 9/2014 | Russell-Clarke et al. |
| 2015/0064474 A1* | 3/2015 | Dejneka .................. C03C 10/00 |
| | | 501/63 |
| 2015/0368149 A1 | 12/2015 | Guo et al. |
| 2016/0090321 A1 | 3/2016 | Bookbinder et al. |
| 2016/0168023 A1 | 6/2016 | Baum et al. |
| 2017/0217825 A1 | 8/2017 | Hasegawa et al. |
| 2017/0355636 A1* | 12/2017 | Borrelli .................. C03C 3/085 |
| 2020/0377404 A1 | 12/2020 | Beall et al. |

\* cited by examiner

COLORED GLASS ARTICLES HAVING IMPROVED MECHANICAL DURABILITY

This application claims the benefit of priority under 35 U.S.C. § 119 of U.S. Provisional Application Ser. No. 63/251,785 filed on Oct. 4, 2021, the content of which is relied upon and incorporated herein by reference in its entirety.

FIELD

The present specification generally relates to glass compositions and glass articles and, in particular, to glass compositions and ion-exchangeable, colored glass articles formed therefrom.

TECHNICAL BACKGROUND

Aluminosilicate glass articles may exhibit superior ion-exchangeability and drop performance. Various industries, including the consumer electronics industry, desire colored materials with the same or similar strength and fracture toughness properties. However, simply including colorants in conventional aluminosilicate glass compositions may not produce the desired color.

Accordingly, a need exists for alternative colored glass articles having high strength and fracture toughness.

SUMMARY

According to a first aspect A1, a colored glass article may comprise: greater than or equal to 50 mol % and less than or equal to 80 mol % $SiO_2$; greater than or equal to 7 mol % and less than or equal to 25 mol % $Al_2O_3$; greater than or equal to 1 mol % and less than or equal to 15 mol % $B_2O_3$; greater than or equal to 5 mol % and less than or equal to 20 mol % $Li_2O$; greater than or equal to 0.5 mol % and less than or equal to 15 mol % $Na_2O$; greater than 0 mol % and less than or equal to 1 mol % $K_2O$; and greater than or equal to $1\times10^{-6}$ mol % and less than or equal to 1 mol % Au, wherein: $R_2O$—$Al_2O_3$ is greater than or equal to $-5$ mol % and less than or equal to 7 mol %, $R_2O$ being the sum of $Li_2O$, $Na_2O$, and $K_2O$.

A second aspect A2 includes the colored glass article according to the first aspect A1, wherein the colored glass article has a transmittance color coordinate in the CIELAB color space, as measured at an article thickness of 1.33 mm under F2 illumination and a 10° standard observer angle, of: L* greater than or equal to 50 and less than or equal to 100; a* greater than or equal to $-15$ and less than or equal to 25; and b* greater than or equal to $-25$ and less than or equal to 25.

A third aspect A3 includes the colored glass article according to the second aspect A2, wherein $R_2O$—$Al_2O_3$ is greater than or equal to $-5$ mol % and less than or equal to 1.5 mol %; and wherein b* is greater than or equal to $-25$ and less than or equal to 10.

A forth aspect A4 includes the colored glass article according to the third aspect A3, wherein $R_2O$—$Al_2O_3$ is greater than or equal to $-3$ mol % and less than or equal to 1.5 mol %; and wherein b* is greater than or equal to $-15$ and less than or equal to 7.

A fifth aspect A5 includes the colored glass article according to the second aspect A2, wherein $R_2O$—$Al_2O_3$ is greater than 1.5 mol % and less than or equal to 7 mol %; and wherein b* is greater than or equal to 0 and less than or equal to 25.

A sixth aspect A6 includes the colored glass article according to the fifth aspect A5, wherein $R_2O$—$Al_2O_3$ is greater than 1.5 mol % and less than or equal to 5 mol %; and wherein b* is greater than or equal to 0 and less than or equal to 15.

A seventh aspect A7 includes the colored article according to any one of the first through sixth aspects A1-A6, wherein $R_2O$—$Al_2O_3$ is greater than or equal to $-3$ mol % and less than or equal to 5 mol %.

An eighth aspect A8 includes the colored glass article according to the seventh aspect A7, wherein $R_2O$—$Al_2O_3$ is greater than or equal to $-1$ mol % and less than or equal to 3 mol %.

A ninth aspect A9 includes the colored article according to any one of the first through eighth aspects A1-A8, wherein the colored glass article comprises greater than or equal to 0.0001 mol % and less than or equal to 0.1 mol % Au.

A tenth aspect A10 includes the colored article according to any one of the first through ninth aspects A1-A9, wherein $R_2O$ is greater than or equal to 6 mol % and less than or equal to 25 mol %.

A eleventh aspect A11 includes the colored glass article according to the tenth aspect A10, wherein $R_2O$ is greater than or equal to 8 mol % and less than or equal to 23 mol %.

An twelfth aspect A12 includes the colored article according to any one of the first through eleventh aspects A1-A11, wherein the colored glass article comprises greater than or equal to 0.01 mol % and less than or equal to 2 mol % $ZrO_2$.

A thirteenth aspect A13 includes the colored glass article according to the twelfth aspect A12, wherein the colored glass article comprises greater than or equal to 0.1 mol % and less than or equal to 1.5 mol % $ZrO_2$.

A fourteenth aspect A14 includes the colored article according to any one of the first through thirteenth aspects A1-A13, wherein the colored glass article comprises greater than or equal to 0.01 mol % and less than or equal to 1 mol % $Fe_2O_3$.

A fifteenth aspect A15 includes the colored article according to the fourteenth aspect A14, wherein the colored glass article comprises greater than or equal to 0.05 mol % and less than or equal to 0.5 mol % $Fe_2O_3$.

A sixteenth aspect A16 includes the colored article according to any one of the first through fifteenth aspects A1-A15, wherein $5.72*Al_2O_3$ (mol %)–$21.4*ZnO$ (mol %)–$2.5*P_2O_5$ (mol %)–$35*Li_2O$ (mol %)–$16.6*B_2O_3$ (mol %)–$20.5*MgO$ (mol %)–$23.3*Na_2O$ (mol %)–$27.9*SrO$ (mol %)–$18.5*K_2O$ (mol %)–$26.3*CaO$ (mol %) is greater than $-609$ mol %.

A seventeenth aspect A17 includes the colored glass article according to any one of the first through sixteenth aspects A1-A16, wherein the colored glass article comprises greater than or equal to 0.01 mol % and less than or equal to 1 mol % $SnO_2$.

An eighteenth aspect A18 includes the colored glass article according to the seventeenth aspect A17, wherein the colored glass article comprises greater than or equal to 0.05 mol % and less than or equal to 0.75 mol % $SnO_2$.

A nineteenth aspect A19 includes the colored glass article according to any one of the first through eighteenth aspects A1-A18, wherein the colored glass article is substantially free of MgO, CaO, ZnO, Cl, or combinations thereof.

A twentieth aspect A20 includes the colored glass article according to any one of the first through nineteenth aspects A1-A19, wherein the colored glass article comprises greater than or equal to 7 mol % and less than or equal to 18 mol % $Li_2O$.

A twenty-first aspect A21 includes the colored glass article according to the twentieth aspect A20, wherein the colored glass article comprises greater than or equal to 9 mol % and less than or equal to 16 mol % $Li_2O$.

A twenty-second aspect A22 includes the colored glass article according to any one of the first through twenty-first aspects A1-A21, wherein the colored glass article comprises greater than or equal to 1 mol % and less than or equal to 12 mol % $Na_2O$.

A twenty-third aspect A23 includes the colored glass article according to the twenty-second aspect A22, wherein the colored glass article comprises greater than or equal to 2 mol % and less than or equal to 10 mol % $Na_2O$.

A twenty-forth aspect A24 includes the colored glass article according to any one of the first through twenty-third aspects A1-A23, wherein the colored glass article comprises greater than or equal to 0.1 mol % and less than or equal to 0.5 mol % $K_2O$.

A twenty-fifth aspect A25 includes the colored glass article according to any one of the first through twenty-fourth aspects A1-A24, wherein the colored glass article comprises greater than or equal to 9 mol % and less than or equal to 23 mol % $Al_2O_3$.

A twenty-sixth aspect A26 includes the colored glass article according to the twenty-fifth aspect A25, wherein the colored glass article comprises greater than or equal to 11 mol % and less than or equal to 20 mol % $Al_2O_3$.

A twenty-seventh aspect A27 includes the colored glass article according to any one of the first through twenty-sixth aspects A1-A26, wherein the colored glass article comprises greater than or equal to 2 mol % and less than or equal to 12 mol % $B_2O_3$.

A twenty-eighth aspect A28 includes the colored glass article according to the twenty-seventh aspect A27, wherein the colored glass article comprises greater than or equal to 3 mol % and less than or equal to 10 mol % $B_2O_3$.

A twenty-ninth aspect A29 includes the colored glass article according to any one of the first through twenty-eighth aspects A1-A28, wherein the colored glass article comprises greater than or equal to 52 mol % and less than or equal to 75 mol % $SiO_2$.

A thirtieth aspect A30 includes the colored glass article according to any one of the first through twenty-ninth aspects A1-A29, wherein the colored glass article has a thickness greater than or equal to 250 µm and less than or equal to 6 mm.

A thirty-first aspect A31 includes the colored glass article according to any one of the first through thirtieth aspects A1-A30, wherein the colored glass article is an ion-exchanged colored glass article.

A thirty-second aspect A32 includes the colored glass article according to the thirty-first aspect A31, wherein the ion-exchanged colored glass article has a depth of compression 10 µm or greater.

A thirty-third aspect A33 includes the colored glass article according to the thirty-first aspect A31 or thirty-second aspect A32, wherein the ion-exchanged colored glass article has a thickness "t" and a depth of compression greater than or equal to 0.15 t.

A thirty-fourth aspect A34 includes the colored glass article according to any one of the thirty-first through thirty-third aspects A31-A33, wherein the ion-exchanged colored glass article has a surface compressive stress greater than or equal to 300 MPa.

A thirty-fifth aspect A35 includes the colored glass article according to any one of the thirty-first through thirty-fourth aspects A31-A34, wherein the ion-exchanged colored glass article has a maximum central tension greater than or equal to 40 MPa.

According to a thirty-sixth aspect A36, a consumer electronic device may comprise: a housing having a front surface, a back surface, and side surfaces; and electrical components provided at least partially within the housing, the electrical components including at least a controller, a memory, and a display, the display being provided at or adjacent the front surface of the housing; wherein the housing comprises the colored glass article according to any one of the first through thirty-fifth aspects A1-A35.

According to a thirty-seventh aspect A37, a glass composition may comprise: greater than or equal to 50 mol % and less than or equal to 80 mol % $SiO_2$; greater than or equal to 7 mol % and less than or equal to 25 mol % $Al_2O_3$; greater than or equal to 1 mol % and less than or equal to 15 mol % $B_2O_3$; greater than or equal to 5 mol % and less than or equal to 20 mol % $Li_2O$; greater than or equal to 0.5 mol % and less than or equal to 15 mol % $Na_2O$; greater than 0 mol % and less than or equal to 1 mol % $K_2O$; and greater than or equal to $1 \times 10^{-6}$ mol % and less than or equal to 1 mol % Au, wherein: $R_2O$—$Al_2O_3$ is greater than or equal to −5 mol % and less than or equal to 7 mol %, $R_2O$ being the sum of $Li_2O$, $Na_2O$, and $K_2O$.

A thirty-eighth aspect A38 includes the glass composition according to the thirty-seventh aspect A37, wherein $R_2O$—$Al_2O_3$ is greater than or equal to −3 mol % and less than or equal to 5 mol %.

A thirty-ninth aspect A39 includes the glass composition according to the thirty-eighth aspect A38, wherein $R_2O$—$Al_2O_3$ is greater than or equal to −1 mol % and less than or equal to 3 mol %.

A fortieth aspect A40 includes the glass compositions according to the thirty-seventh through thirty-ninth aspects A37-A39, wherein the glass composition comprises greater than or equal to 0.0001 mol % and less than or equal to 0.1 mol % Au.

A forty-first aspect A41 includes the glass composition according to any one of the thirty-seventh through fortieth aspects A37-A40, wherein $R_2O$ is greater than or equal to 6 mol % and less than or equal to 25 mol %.

A forty-second aspect A42 includes the glass composition according to the forty-first aspect A41, wherein $R_2O$ is greater than or equal to 8 mol % and less than or equal to 23 mol %.

A forty-third aspect A43 includes the glass composition according to any one of the thirty-seventh through forty-second aspects A37-A42, wherein the glass composition comprises greater than or equal to 0.01 mol % and less than or equal to 2 mol % $ZrO_2$.

A forty-fourth aspect A44 includes the glass composition of the forty-third aspect A43, wherein the glass composition comprises greater than or equal to 0.1 mol % and less than or equal to 1.5 mol % $ZrO_2$.

A forty-fifth aspect A45 includes the glass composition of any one of the thirty-seventh through forty-fourth aspects A37-A44, wherein the glass composition comprises greater than or equal to 0.01 mol % and less than or equal to 1 mol % $Fe_2O_3$.

A forty-sixth aspect A46 includes the glass composition according to the forty-fifth aspect A45, wherein the glass composition comprises greater than or equal to 0.05 mol % and less than or equal to 0.5 mol % $Fe_2O_3$.

A forty-seventh aspect A47 includes the glass composition according to any one of the thirty-seventh through forty-sixth aspects A37-A46, wherein 5.72*$Al_2O_3$ (mol %)−21.4*ZnO (mol %)−2.5*$P_2O_5$ (mol %)−35*$Li_2O$ (mol %)−16.6*$B_2O_3$ (mol %)−20.5*MgO (mol %)−23.3*$Na_2O$ (mol %)−27.9*SrO (mol %)−18.5*$K_2O$ (mol %)−26.3*CaO (mol %) is greater than −609 mol %.

A forty-eighth aspect A48 includes the glass composition according to any one of the thirty-seventh through forty-seventh aspects A37-A47, wherein the glass composition comprises greater than or equal to 0.01 mol % and less than or equal to 1 mol % $SnO_2$.

A forty-ninth aspect A49 includes the glass composition according to the forty-eighth aspect A48, wherein the glass composition comprises greater than or equal to 0.05 mol % and less than or equal to 0.75 mol % $SnO_2$.

A fiftieth aspect A50 includes the glass composition according to any one of the thirty-seventh through forty-ninth aspects A37-A49, wherein the glass composition is substantially free of MgO, CaO, ZnO, Cl, or combinations thereof.

A fifty-first aspect A51 includes the glass composition according to any one of the thirty-seventh through fiftieth aspects A37-A50, wherein the glass composition comprises greater than or equal to 7 mol % and less than or equal to 18 mol % $Li_2O$.

A fifty-second aspect A52 includes the glass composition according to the fifty-first aspect A51, wherein the glass composition comprises greater than or equal to 9 mol % and less than or equal to 16 mol % $Li_2O$.

A fifty-third aspect A53 includes the glass composition according to any one of the thirty-seventh through fifty-second aspects A37-A52, wherein the glass composition comprises greater than or equal to 1 mol % and less than or equal to 12 mol % $Na_2O$.

A fifty-fourth aspect A54 includes the glass composition according to the fifty-third aspect A53, wherein the glass composition comprises greater than or equal to 2 mol % and less than or equal to 10 mol % $Na_2O$.

A fifty-fifth aspect A55 includes the glass composition according to any one of the thirty-seventh through fifty-fourth aspects A37-A54, wherein the glass composition comprises greater than or equal to 0.1 mol % and less than or equal to 0.5 mol % $K_2O$.

A fifty-sixth aspect A56 includes the glass composition according to any one of the thirty-seventh through fifty-fifth aspects A37-A55, wherein the glass composition comprises greater than or equal to 9 mol % and less than or equal to 23 mol % $Al_2O_3$.

A fifty-seventh aspect A57 includes the glass composition according to the fifty-sixth aspect A56, wherein the glass composition comprises greater than or equal to 11 mol % and less than or equal to 20 mol % $Al_2O_3$.

A fifty-eighth aspect A58 includes the glass composition according to any one of the thirty-seventh through fifty-seventh aspect A37-A57, wherein the glass composition comprises greater than or equal to 2 mol % and less than or equal to 12 mol % $B_2O_3$.

A fifty-ninth aspect A59 includes the glass composition according to the fifty-eighth aspect A58, wherein the glass composition comprises greater than or equal to 3 mol % and less than or equal to 10 mol % $B_2O_3$.

A sixtieth aspect A60 includes the glass composition according to any one of the thirty-seventh through fifty-ninth aspects A37-A59, wherein the glass composition comprises greater than or equal to 52 mol % and less than or equal to 75 mol % $SiO_2$.

According to a sixty-first aspect A61, a method of forming a colored glass article may comprise: heat treating a glass composition to form a glass article, the glass composition comprising: greater than or equal to 50 mol % and less than or equal to 80 mol % $SiO_2$; greater than or equal to 7 mol % and less than or equal to 25 mol % $Al_2O_3$; greater than or equal to 1 mol % and less than or equal to 15 mol % $B_2O_3$; greater than or equal to 5 mol % and less than or equal to 20 mol % $Li_2O$; greater than or equal to 0.5 mol % and less than or equal to 15 mol % $Na_2O$; greater than 0 mol % and less than or equal to 1 mol % $K_2O$; and greater than or equal to $1\times10^{-6}$ mol % and less than or equal to 1 mol % Au, wherein: $R_2O$—$Al_2O_3$ is greater than or equal to −5 mol % and less than or equal to 7 mol %, $R_2O$ being the sum of $Li_2O$, $Na_2O$, and $K_2O$; and subjecting the glass article to a heat treatment cycle at a temperature greater than or equal to 500° C. and less than or equal to 800° C. and a duration greater than or equal to 0.25 hour and less than or equal to 24 hours to produce the colored glass article.

A sixty-second aspect A62 includes the method according to the sixty-first aspect A61, wherein the temperature of the heat treatment cycle is greater than or equal to 550° C. and less than or equal to 775° C.

A sixty-third aspect A63 includes the method according to the sixty-first aspect A61 or sixty-second aspect A62, wherein the duration of the heat treatment cycle is greater than or equal to 0.5 hour and less than or equal to 16 hours.

A sixty-fourth aspect A64 includes the method according to any one of the sixty-first through sixty-third aspects A61-A63, further comprising strengthening the colored glass article in an ion exchange bath at a temperature greater than or equal to 350° C. to less than or equal to 500° C. for a time period greater than or equal to 2 hours to less than or equal to 12 hours to form an ion exchanged glass-ceramic article.

A sixty-fifth aspect A65 includes the method according to the sixty-fourth aspect A64, wherein the ion exchange bath comprises $KNO_3$.

A sixty-sixth aspect A66 includes the method according to the sixty-fifth aspect A65, wherein the ion exchange bath comprises $NaNO_3$.

Additional features and advantages of the colored glass articles described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
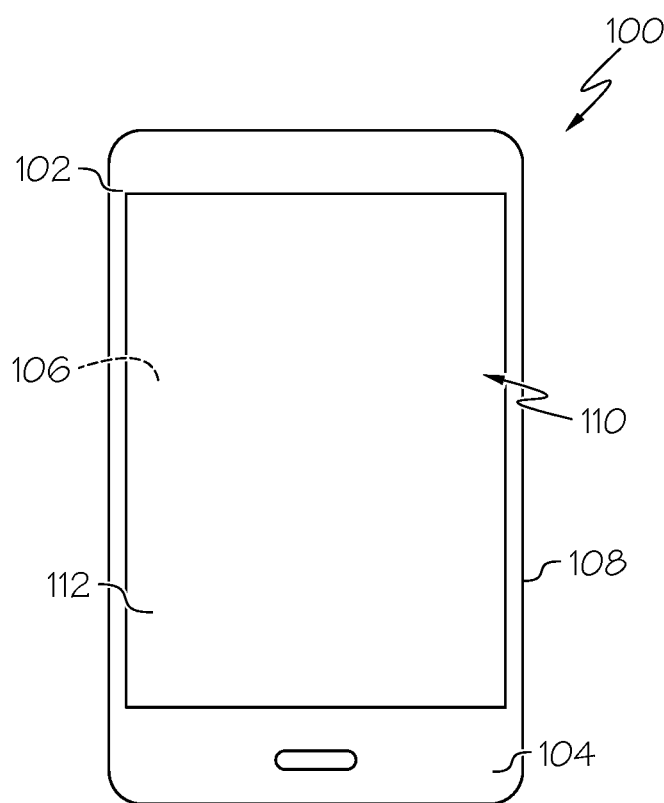
FIG. 1 is a plan view of an electronic device incorporating any of the colored glass articles according to one or more embodiments described herein.

Reference will now be made in detail to various embodiments of glass compositions and colored glass articles formed therefrom having a desired color. According to embodiments, a colored glass article includes greater than or equal to 50 mol % and less than or equal to 80 mol % $SiO_2$; greater than or equal to 7 mol % and less than or equal to 25 mol % $Al_2O_3$; greater than or equal to 1 mol % and less than or equal to 15 mol % $B_2O_3$; greater than or equal to 5 mol % and less than or equal to 20 mol % $Li_2O$; greater than or equal to 0.5 mol % and less than or equal to 15 mol % $Na_2O$; greater than 0 mol % and less than or equal to 1 mol % $K_2O$; and greater than or equal to $1\times10^{-6}$ mol % and less than or equal to 1 mol % Au. $R_2O$—$Al_2O_3$ is greater than or equal to −5 mol % and less than or equal to 7 mol %, $R_2O$ being the sum of $Li_2O$, $Na_2O$, and $K_2O$.

Various embodiments of colored glass articles and methods of making the same will be described herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In the embodiments of the glass compositions and the resultant colored glass articles described herein, the concentrations of constituent components in oxide form (e.g., $SiO_2$, $Al_2O_3$, and the like) are specified in mole percent (mol %) on an oxide basis, unless otherwise specified.

In embodiments of the glass compositions and the resultant colored glass articles described herein, the concentration of Au and Cl is specified in mole percent (mol %), unless otherwise specified.

The term "substantially free," when used to describe the concentration and/or absence of a particular constituent component in a glass composition and the resultant colored glass article, means that the constituent component is not intentionally added to the glass composition and the resultant colored glass article. However, the glass composition and the resultant colored glass article may contain traces of the constituent component as a contaminant or tramp in amounts of less than 0.1 mol %.

The terms "0 mol %" and "free," when used to describe the concentration and/or absence of a particular constituent component in a glass composition and the resultant colored glass article, means that the constituent component is not present in glass composition and the resultant colored glass article.

Fracture toughness ($K_{1C}$) represents the ability of a glass composition to resist fracture. Fracture toughness is measured on a non-strengthened glass article, such as measuring the $K_{1C}$ value prior to ion exchange (IOX) treatment of the glass article, thereby representing a feature of a glass substrate prior to IOX. The fracture toughness test methods described herein are not suitable for glasses that have been exposed to IOX treatment. But, fracture toughness measurements performed as described herein on the same glass prior to IOX treatment (e.g., glass substrates) correlate to fracture toughness after IOX treatment, and are accordingly used as such. The chevron notched short bar (CNSB) method utilized to measure the $K_{1C}$ value is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that Y*m is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992). Unless otherwise specified, all fracture toughness values were measured by chevron notched short bar (CNSB) method.

The term "liquidus viscosity," as used herein, refers to the viscosity of the glass composition at the onset of devitrification (i.e., at the liquidus temperature as determined with the gradient furnace method according to ASTM C829-81).

Surface compressive stress is measured with a surface stress meter (FSM) such as commercially available instruments such as the FSM-6000, manufactured by Orihara Industrial Co., Ltd. (Japan). Surface stress measurements rely upon the measurement of the stress optical coefficient (SOC), which is related to the birefringence of the glass article. SOC, in turn, is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) is also measured with the FSM. The maximum central tension (CT) values are measured using a scattered light polariscope (SCALP) technique known in the art.

The term "depth of compression" (DOC), as used herein, refers to the position in the article where compressive stress transitions to tensile stress.

The term "CIELAB color space," as used herein, refers to a color space defined by the International Commission on Illumination (CIE) in 1976. It expresses color as three values: L* for the lightness from black (0) to white (100), a* from green (−) to red (+), and B* from blue (−) to yellow (+).

The term "color gamut," as used herein, refers to the pallet of colors that may be achieved by the colored glass articles within the CIELAB color space.

The "optical transmission spectra," as used herein, were obtained using an Agilent Cary 60 spectrophotometer with a scan range of 250 nm to 800 nm, a scan step of 2 nm, a signal average of 0.5 s, and a spot size of 2 mm. The optical transmission data obtained were used to plot coordinates in the CIELAB color space as described in R. S. Berns, *Billmeyer and Saltzman's Principles of Color Technology*, 3rd. Ed., John Wiley & Sons, New York (2000).

Colorants have been added to conventional aluminosilicate glass compositions to achieve a colored glass article having a desired color and improved mechanical properties. For example, gold (Au) doped glass articles generally appear red, orange, or purple. However, simply including colorants in aluminosilicate glass compositions may not produce the desired color.

Disclosed herein are glass compositions and colored glass articles formed therefrom that mitigate the aforementioned problems such that Au may be added to aluminosilicate glass compositions to produce colored glass articles having the desired color while retaining superior ion-exchange and drop performance. Specifically, the concentration of certain constituent components may be adjusted to achieve a desired color and to prevent precipitation of Au particles in the glass network.

The glass compositions and colored glass articles described herein may be described as aluminoborosilicate glass compositions and colored glass articles and comprise $SiO_2$, $Al_2O_3$, and $B_2O_3$. In addition to $SiO_2$, $Al_2O_3$, and $B_2O_3$, the glass compositions and colored glass articles described herein include Auto produce colored glass articles having the desired color. The glass compositions and colored glass articles described herein also include alkali oxides, such as $Li_2O$ and $Na_2O$, to enable the ion-exchangeability of the colored glass articles. Additionally, the difference of $R_2O$ and $Al_2O_3$ (i.e. $R_2O$ (mol %)−$Al_2O_3$ (mol %)) in the glass compositions and resultant colored glass articles described herein may be adjusted to produce a desired observable color (e.g., pink, purple, red, or orange). Furthermore, the viscosity of the glass composition may be adjusted to prevent devitrification of the glass composition and precipitation of Au particles during melting and forming that may limit the color gamut that may be achieved.

$SiO_2$ is the primary glass former in the glass compositions described herein and may function to stabilize the network structure of the colored glass articles. The concentration of $SiO_2$ in the glass compositions and resultant colored glass articles should be sufficiently high (e.g., greater than or equal to 50 mol %) to enhance the chemical durability of the glass composition and, in particular, the resistance of the glass composition to degradation upon exposure to acidic solutions, basic solutions, and in water. The amount of $SiO_2$ may be limited (e.g., to less than or equal to 80 mol %) to control the melting point of the glass composition, as the melting point of pure $SiO_2$ or high $SiO_2$ glasses is undesirably high. Thus, limiting the concentration of $SiO_2$ may aid in improving the meltability and the formability of the resultant colored glass article.

In embodiments, the glass composition and the resultant colored glass article may comprise greater than or equal to 50 mol % and less than or equal to 80 mol % $SiO_2$. In embodiments, the glass composition and the resultant colored glass article may comprise greater than or equal to 52 mol % and less than or equal to 75 mol % $SiO_2$. In embodiments, the concentration of $SiO_2$ in the glass composition and the resultant colored glass article may be greater than or equal to 50 mol %, greater than or equal to 52 mol %, greater than or equal to 54 mol %, greater than or equal to 56 mol %, greater than or equal to 58 mol %, or even greater than or equal to 60 mol %. In embodiments, the concentration of $SiO_2$ in the glass composition and the colored resultant glass article may be less than or equal to 80 mol %, less than or equal to 75 mol %, less than or equal to 73 mol %, less than or equal to 71 mol %, or even less than or equal to 69 mol %. In embodiments, the concentration of $SiO_2$ in the glass composition and the resultant colored glass article may be greater than or equal to 50 mol % and less than or equal to 80 mol %, greater than or equal to 50 mol % and less than or equal to 75 mol %, greater than or equal to 50 mol % and less than or equal to 73 mol %, greater than or equal to 50 mol % and less than or equal to 71 mol %, greater than or equal to 50 mol % and less than or equal to 69 mol %, greater than or equal to 52 mol % and less than or equal to 80 mol %, greater than or equal to 52 mol % and less than or equal to 75 mol %, greater than or equal to 52 mol % and less than or equal to 73 mol %, greater than or equal to 52 mol % and less than or equal to 71 mol %, greater than or equal to 52 mol % and less than or equal to 69 mol %, greater than or equal to 54 mol % and less than or equal to 80 mol %, greater than or equal to 54 mol % and less than or equal to 75 mol %, greater than or equal to 54 mol % and less than or equal to 73 mol %, greater than or equal to 54 mol % and less than or equal to 71 mol %, greater than or equal to 54 mol % and less than or equal to 69 mol %, greater than or equal to 56 mol % and less than or equal to 80 mol %, greater than or equal to 56 mol % and less than or equal to 75 mol %, greater than or equal to 56 mol % and less than or equal to 73 mol %, greater than or equal to 56 mol % and less than or equal to 71 mol %, greater than or equal to 56 mol % and less than or equal to 69 mol %, greater than or equal to 58 mol % and less than or equal to 80 mol %, greater than or equal to 58 mol % and less than or equal to 75 mol %, greater than or equal to 58 mol % and less than or equal to 73 mol %, greater than or equal to 58 mol % and less than or equal to 71 mol %, greater than or equal to 58 mol % and less than or equal to 69 mol %, greater than or equal to 50 mol % and less than or equal to 80 mol %, greater than or equal to 60 mol % and less than or equal to 75 mol %, greater than or equal to 60 mol % and less than or equal to 73 mol %, greater than or equal to 60 mol % and less than or equal to 71 mol %, or even greater than or equal to 60 mol % and less than or equal to 69 mol %, or any and all sub-ranges formed from any of these endpoints.

Like $SiO_2$, $Al_2O_3$ may also stabilize the glass network and additionally provides improved mechanical properties and chemical durability to the glass composition and the resultant colored glass article. The amount of $Al_2O_3$ may also be tailored to control the viscosity of the glass composition. $Al_2O_3$ may be included such that the resultant glass composition has the desired fracture toughness (e.g., greater than or equal to 0.7 MPa·m$^{1/2}$). However, if the amount of $Al_2O_3$ is too high (e.g., greater than 25 mol %), the viscosity of the glass melt may increase, thereby diminishing the formability of the colored glass article.

Accordingly, in embodiments, the glass composition and the resultant colored glass article may comprise greater than or equal to 7 mol % and less than or equal to 25 mol % $Al_2O_3$. In embodiments, the glass composition and the resultant colored glass article may comprise greater than or equal to 9 mol % and less than or equal to 23 mol % $Al_2O_3$. In embodiments, the glass composition and the resultant colored glass article may comprise greater than or equal to 11 mol % and less than or equal to 20 mol % $Al_2O_3$. In embodiments, the concentration of $Al_2O_3$ in the glass composition and the resultant colored glass article may be greater than or equal to 7 mol %, greater than or equal to 9 mol %, greater than or equal to 11 mol %, or even greater than or equal to 13 mol %. In embodiments, the concentration of $Al_2O_3$ in the glass composition and the resultant colored glass article may be less than or equal to 25 mol %, less than or equal to 23 mol %, less than or equal to 20 mol %, or even less than or equal to 17 mol %. In embodiments, the concentration of $Al_2O_3$ in the glass composition and the resultant colored glass article may be greater than or equal to 7 mol % and less than or equal to 25 mol %, greater than or equal to 7 mol % and less than or equal to 23 mol %, greater than or equal to 7 mol % and less than or equal to 20 mol %, greater than or equal to 7 mol % and less than or equal to 17 mol %, greater than or equal to 9 mol % and less than or equal to 25 mol %, greater than or equal to 9 mol % and less than or equal to 23 mol %, greater than or equal to 9 mol % and less than or equal to 20 mol %, greater than or equal to 9 mol % and less than or equal to 17 mol %, greater than or equal to 11 mol % and less than or equal to 25 mol %, greater than or equal to 11 mol % and less than or equal to 23 mol %, greater than or equal to 11 mol % and less than or equal to 20 mol %, greater than or equal to 11 mol % and less than or equal to 17 mol %, greater than or equal to 13 mol % and less than or equal to 25 mol %, greater than or equal to 13 mol % and less than or equal to 23 mol %, greater than or equal to 13 mol % and less than or equal to 20 mol %, greater than or equal to 13 mol % and less than or equal to 17 mol %, or any and all sub-ranges formed from any of these endpoints.

$B_2O_3$ helps improve the damage resistance of the resultant colored glass article. In addition, $B_2O_3$ reduces the formation of non-bridging oxygen, the presence of which may reduce fracture toughness. The concentration of $B_2O_3$ should be sufficiently high (e.g., greater than or equal to 1 mol %) to reduce the melting point of the glass composition, improve the formability, and increase the fracture toughness of the colored glass article. However, if $B_2O_3$ is too high (e.g., greater than 15 mol %), the annealing point and strain point may decrease, which increases stress relaxation and reduces the overall strength of the colored glass article.

In embodiments, the glass composition and the resultant colored glass article may comprise greater than or equal to 1 mol % and less than or equal to 15 mol % $B_2O_3$. In embodiments, the glass composition and the resultant colored glass article may comprise greater than or equal to 2 mol % and less than or equal to 12 mol % $B_2O_3$. In embodiments, the glass composition and the resultant colored glass article may comprise greater than or equal to 3 mol % and less than or equal to 10 mol % $B_2O_3$. In embodiments, the concentration of $B_2O_3$ in the glass composition and the resultant colored glass article may be greater than or equal to 1 mol %, greater than or equal to 2 mol %, greater than or equal to 3 mol %, or even greater than or equal to 4 mol %. In embodiments, the concentration of $B_2O_3$ in the glass composition and the resultant colored glass article may be less than or equal to 15 mol %, less than or equal to 12 mol %, less than or equal to 10 mol %, less than or equal to 8 mol %, or even less than or equal to 6 mol %. In embodiments, the concentration of $B_2O_3$ in the glass composition and the resultant colored glass article may be greater than or equal to 1 mol % and less than or equal to 15 mol %, greater than or equal to 1 mol % and less than or equal to 12 mol %, greater than or equal to 1 mol % and less than or equal to 10 mol %, greater than or equal to 1 mol % and less than or equal to 8 mol %, greater than or equal to 1 mol % and less than or equal to 6 mol %, greater than or equal to 2 mol % and less than or equal to 15 mol %, greater than or equal to 2 mol % and less than or equal to 12 mol %, greater than or equal to 2 mol % and less than or equal to 10 mol %, greater than or equal to 2 mol % and less than or equal to 8 mol %, greater than or equal to 2 mol % and less than or equal to 6 mol %, greater than or equal to 3 mol % and less than or equal to 15 mol %, greater than or equal to 3 mol % and less than or equal to 12 mol %, greater than or equal to 3 mol % and less than or equal to 10 mol %, greater than or equal to 3 mol % and less than or equal to 8 mol %, greater than or equal to 3 mol % and less than or equal to 6 mol %, greater than or equal to 4 mol % and less than or equal to 15 mol %, greater than or equal to 4 mol % and less than or equal to 12 mol %, greater than or equal to 4 mol % and less than or equal to 10 mol %, greater than or equal to 4 mol % and less than or equal to 8 mol %, or even greater than or equal to 4 mol % and less than or equal to 6 mol %, or any and all sub-ranges formed from any of these endpoints.

As described hereinabove, the glass compositions and the resultant colored glass articles may contain alkali oxides, such as $Li_2O$, $Na_2O$, and $K_2O$, to enable the ion-exchangeability of the colored glass articles.

$Li_2O$ aids in the ion-exchangeability of the colored glass article and also reduces the softening point of the glass composition, thereby increasing the formability of the colored glass articles. In addition, $Li_2O$ decreases the melting point of the glass composition, which may help improve Au retention. The concentration of $Li_2O$ in the glass compositions and resultant colored glass articles should be sufficiently high (e.g., greater than or equal to 5 mol %) to reduce the melting point of the glass composition and achieve the desired maximum central tension (e.g., greater than or equal to 40 MPa) following ion-exchange. However, if the amount of $Li_2O$ is too high (e.g., greater than 20 mol %), the liquidus temperature may increase, thereby diminishing the manufacturability of the colored glass article.

In embodiments, the glass composition and the resultant colored glass article may comprise greater than or equal to 5 mol % and less than or equal to 20 mol % $Li_2O$. In embodiments, the glass composition and the resultant colored glass article may comprise greater than or equal to 7 mol % and less than or equal to 18 mol % $Li_2O$. In embodiments, the glass composition and the resultant colored glass article may comprise greater than or equal to 9 mol % and less than or equal to 16 mol % $Li_2O$. In embodiments, the concentration of $Li_2O$ in the glass composition and the resultant colored glass article may be greater than or equal to 5 mol %, greater than or equal to 7 mol %, or even greater than or equal to 9 mol %. In embodiments, the concentration of $Li_2O$ in the glass composition and the resultant colored glass article may be less than or equal to 20 mol %, less than or equal to 18 mol %, less than or equal to 16 mol %, less than or equal to 14 mol %, or even less than or equal to 12 mol %. In embodiments, the concentration of $Li_2O$ in the glass composition and the resultant colored glass article may be greater than or equal to 5 mol % and less than or equal to 20 mol %, greater than or equal to 5 mol % and less than or equal to 18 mol %, greater than or equal to 5 mol % and less than or equal to 16 mol %, greater than or equal to 5 mol % and less than or equal to 14 mol %, greater than or equal to 5 mol % and less than or equal to 12 mol %, greater than or equal to 7 mol % and less than or equal to 20 mol %, greater than or equal to 7 mol % and less than or equal to 18 mol %, greater than or equal to 7 mol % and less than or equal to 16 mol %, greater than or equal to 7 mol % and less than or equal to 14 mol %, greater than or equal to 7 mol % and less than or equal to 12 mol %, greater than or equal to 9 mol % and less than or equal to 20 mol %, greater than or equal to 9 mol % and less than or equal to 18 mol %, greater than or equal to 9 mol % and less than or equal to 16 mol %, greater than or equal to 9 mol % and less than or equal to 14 mol %, or even greater than or equal to 9 mol % and less than or equal to 12 mol %, or any and all sub-ranges formed from any of these endpoints.

$Na_2O$ improves diffusivity of alkali ions in the glass and thereby reduces ion-exchange time and helps achieve the desired surface compressive stress (e.g., greater than or equal to 300 MPa). $Na_2O$ also improves the formability of the colored glass article. However, if too much $Na_2O$ is added to the glass composition, the melting point may be too low. As such, in embodiments, the concentration of $Li_2O$ present in the glass composition and the resultant colored glass article may be greater than the concentration of $Na_2O$ present in the glass composition and the resultant colored glass article.

In embodiments, the glass composition and the resultant colored glass article may comprise greater than or equal to 0.5 mol % and less than or equal to 15 mol % $Na_2O$. In embodiments, the glass composition and the resultant colored glass article may comprise greater than or equal to 1 mol % and less than or equal to 12 mol % $Na_2O$. In embodiments, the glass composition and the resultant colored glass article may comprise greater than or equal to 2 mol % and less than or equal to 10 mol % $Na_2O$. In embodiments, the concentration of $Na_2O$ in the glass composition and the resultant colored glass article may be greater than or equal to 0.5 mol %, greater than or equal to 1 mol %, greater than or equal to 2 mol %, greater than or equal to 3 mol %, or even greater than or equal to 4 mol %. In embodiments, the concentration of $Na_2O$ in the glass composition and the resultant colored glass article may be less than or equal to 15 mol %, less than or equal to 12 mol %, less than or equal to 10 mol %, less than or equal to 8 mol %, or even less than or equal to 6 mol %. In embodiments, the concentration of $Na_2O$ in the glass composition and the resultant colored glass article may be greater than or equal to 0.5 mol % and less than or equal to 15 mol %, greater than or equal to 0.5 mol % and less than or equal to 12 mol %, greater than or equal to 0.5 mol % and less than or equal to 10 mol %, greater than or equal to 0.5 mol % and less than or equal to 8 mol %, greater than or equal to 0.5 mol % and less than or equal to 6 mol %, greater than or equal to 1 mol % and less than or equal to 15 mol %, greater than or equal to 1 mol % and less than or equal to 12 mol %, greater than or equal to 1 mol % and less than or equal to 10 mol %, greater than or equal to 1 mol % and less than or equal to 8 mol %, greater than or equal to 1 mol % and less than or equal to 6 mol %, greater than or equal to 2 mol % and less than or equal to 15 mol %, greater than or equal to 2 mol % and less than or equal to 12 mol %, greater than or equal to 2 mol % and less than or equal to 10 mol %, greater than or equal to 2 mol % and less than or equal to 8 mol %, greater than or equal to 2 mol % and less than or equal to 6 mol %, greater than or equal to 3 mol % and less than or equal to 15 mol %, greater than or equal to 3 mol % and less than or equal to 12 mol %, greater than or equal to 3 mol % and less than or equal to 10 mol %, greater than or equal to 3 mol % and less than or equal to 8 mol %, greater than or equal to 3 mol % and less than or equal to 6 mol %, greater than or equal to 4 mol % and less than or equal to 15 mol %, greater than or equal to 4 mol % and less than or equal to 12 mol %, greater than or equal to 4 mol % and less than or equal to 10 mol %, greater than or equal to 4 mol % and less than or equal to 8 mol %, or even greater than or equal to 4 mol % and less than or equal to 6 mol %, or any and all sub-ranges formed from any of these endpoints.

$K_2O$ promotes ion-exchange and may increase the depth of compression and decrease the melting point to improve the formability of the colored glass article. However, adding too much $K_2O$ may cause the surface compressive stress and melting point to be too low. Accordingly, in embodiments, the amount of $K_2O$ added to the glass composition may be limited.

In embodiments, the glass composition and the resultant colored glass article may comprise greater than 0 mol % and less than or equal to 1 mol % $K_2O$. In embodiments, the glass composition and the resultant colored glass article may optionally comprise greater than 0.1 mol % and less than or equal to 0.5 mol % $K_2O$. In embodiments, the concentration of $K_2O$ in the glass composition and the resultant colored glass article may be greater than 0 mol % or even greater than or equal to 0.1 mol %. In embodiments, the concentration of $K_2O$ in the glass composition and the resultant colored glass article may be less than or equal to 1 mol %, less than or equal to 0.5 mol %, or even less than or equal to 0.25 mol %. In embodiments, the concentration of $K_2O$ in the glass composition and the resultant colored glass article may be greater than 0 mol % and less than or equal to 1 mol %, greater than 0 mol % and less than or equal to 0.5 mol %, greater than 0 mol % and less than or equal to 0.25 mol %, greater than or equal to 0.1 mol % and less than or equal to 1 mol %, greater than or equal to 0.1 mol % and less than or equal to 0.5 mol %, or even greater than or equal to 0.1 mol % and less than or equal to 0.25 mol %, or any and all sub-ranges formed from any of these endpoints.

As used herein, $R_2O$ is the sum (in mol %) of $Na_2O$, $K_2O$, and $Li_2O$ (i.e., $R_2O=Na_2O$ (mol %)+$K_2O$ (mol %)+$Li_2O$ (mol %)) present in the glass composition. As noted herein, alkali oxides, such as $Na_2O$, $K_2O$, and $Li_2O$, aid in decreasing the softening point and molding temperature of the glass composition, thereby offsetting the increase in the softening point and molding temperature of the glass composition due to higher amounts of $SiO_2$ in the glass composition, for example. The decrease in the softening point and molding temperature may be further reduced by including combinations of alkali oxides (e.g., two or more alkali oxides) in the glass composition, a phenomenon referred to as the "mixed alkali effect." However, it has been found that if the amount of alkali oxide is too high, the average coefficient of thermal expansion of the glass composition increases to greater than $100 \times 10^7/°$ C., which may be undesirable.

In embodiments, the concentration of $R_2O$ in the glass composition and the resultant colored glass article may be greater than or equal to 6 mol % and less than or equal to 25 mol %. In embodiments, the concentration of $R_2O$ in the glass composition and the resultant colored glass article may be greater than or equal to 8 mol % and less than or equal to 23 mol %. In embodiments, the concentration of $R_2O$ in the glass composition and the resultant colored glass article may be greater than or equal to 6 mol %, greater than or equal to 8 mol %, greater than 10 mol %, greater than or equal to 12 mol %, or even greater than or equal to 14 mol %. In embodiments, the concentration of $R_2O$ in the glass composition and the resultant colored glass article may be less than or equal to 25 mol %, less than or equal to 23 mol %, less than or equal to 20 mol %, or even less than or equal to 18 mol %. In embodiments, the concentration of $R_2O$ in the glass composition and the resultant colored glass article may be greater than or equal to 6 mol % and less than or equal to 25 mol %, greater than or equal to 6 mol % and less than or equal to 23 mol %, greater than or equal to 6 mol % and less than or equal to 20 mol %, greater than or equal to 6 mol % and less than or equal to 18 mol %, greater than or equal to 8 mol % and less than or equal to 25 mol %, greater than or equal to 8 mol % and less than or equal to 23 mol %, greater than or equal to 8 mol % and less than or equal to 20 mol %, greater than or equal to 8 mol % and less than or equal to 18 mol %, greater than or equal to 10 mol % and less than or equal to 25 mol %, greater than or equal to 10 mol % and less than or equal to 23 mol %, greater than or equal to 10 mol % and less than or equal to 20 mol %, greater than or equal to 10 mol % and less than or equal to 18 mol %, greater than or equal to 12 mol % and less than or equal to 25 mol %, greater than or equal to 12 mol % and less than or equal to 23 mol %, greater than or equal to 12 mol % and less than or equal to 20 mol %, greater than or equal to 12 mol % and less than or equal to 18 mol %, greater than or equal to 14 mol % and less than or equal to 25 mol %, greater than or equal to 14 mol % and less than or equal to 23 mol %, greater than or equal to 14 mol % and less than or equal to 20 mol %, or even greater than or equal to 14 mol % and less than or equal to 18 mol %, or any and all sub-ranges formed from any of these endpoints.

In embodiments, the difference between $R_2O$ and $Al_2O_3$ (i.e. $R_2O$ (mol %)–$Al_2O_3$ (mol %)) in the glass composition may be adjusted to produce a desired observable color (e.g., pink, purple, red, or orange). Along with the temperature and time of the heat treatment, the analyzed $R_2O$—$Al_2O_3$ of the resultant colored glass article may correlate with the observable color of the colored glass article after heat treatment, as discussed herein. In embodiments, $R_2O$—$Al_2O_3$ in the glass composition and the resultant colored glass article may be greater than or equal to −5 mol % and less than or equal to 7 mol %. In embodiments, $R_2O$—$Al_2O_3$ in the glass composition and the resultant colored glass article may be greater than or equal to −3 mol % and less than or equal to 6 mol %. In embodiments, $R_2O$—$Al_2O_3$ in the glass composition and the resultant colored glass article may be greater than or equal to −1 mol % and less than or equal to 5 mol %. In embodiments, $R_2O$—$Al_2O_3$ in the glass composition and the resultant colored glass article may be greater than or equal to −5 mol % and less than or equal to 1.5 mol %. In embodiments, $R_2O$—$Al_2O_3$ in the glass composition and the resultant colored glass article may be greater than or equal to −3 mol % and less than or equal to 1.5 mol %. In embodiments, $R_2O$—$Al_2O_3$ in the glass composition and the resultant colored glass article may be greater than or equal to 1.5 mol % and less than or equal to 7 mol %. In embodiments, $R_2O$—$Al_2O_3$ in the glass composition and the resultant colored glass article may be greater than or equal to 1.5 mol % and less than or equal to 5 mol %. In embodiments, $R_2O$—$Al_2O_3$ in the glass composition and the resultant colored glass article may be greater than or equal to −5 mol %, greater than or equal to −3, greater than or equal to −1 mol %, greater than or equal to 0 mol %, or even greater than or equal to 1.5. In embodiments, $R_2O$—$Al_2O_3$ in the glass composition and the resultant colored glass article may be less than or equal to 7 mol %, less than or equal to 5 mol %, less than or equal to 3 mol %, or even less than or equal to 1.5 mol %. In embodiments, $R_2O$—$Al_2O_3$ in the glass composition and the resultant colored glass article may be greater than or equal to −5 mol % and less than or equal to 7 mol %, greater than or equal to −5 mol % and less than or equal to 5 mol %, greater than or equal to −5 mol % and less than or equal to 3 mol %, greater than or equal to −5 mol % and less than or equal to 1.5 mol %, greater than or equal to −3 mol % and less than or equal to 7 mol %, greater than or equal to −3 mol % and less than or equal to 5 mol %, greater than or equal to −3 mol % and less than or equal to 3 mol %, greater than or equal to −3 mol % and less than or equal to 1.5 mol %, greater than or equal to −1 mol % and less than or equal to 7 mol %, greater than or equal to −1 mol % and less than or equal to 5 mol %, greater than or equal to −1 mol % and less than or equal to 3 mol %, greater than or equal to −1 mol % and less than or equal to 1.5 mol %, greater than or equal to 0 mol % and less than or equal to 7 mol %, greater than or equal to 0 mol % and less than or equal to 5 mol %, greater than or equal to 0 mol % and less than or equal to 3 mol %, greater than or equal to 0 mol % and less than or equal to 1.5 mol %, greater than or equal to 1.5 mol % and less than or equal to 7 mol %, greater than or equal to 1.5 mol % and less than or equal to 5 mol %, or even greater than or equal to 1.5 mol % and less than or equal to 3 mol %, or any and all sub-ranges formed from any of these endpoints.

The glass compositions and the resultant colored glass articles described herein may further comprise $ZrO_2$. $ZrO_2$ may act as a colorant in addition to Au, producing colored glass articles that may be, for example, red in color. In embodiments, the glass composition and the resultant colored glass article may comprise greater than or equal to 0.01 mol % and less than or equal to 2 mol % $ZrO_2$. In embodiments, the glass composition and the resultant colored glass article may comprise greater than or equal to 0.1 mol % and less than or equal to 1.5 mol % $ZrO_2$. In embodiments, the concentration of $ZrO_2$ in the glass composition may be greater than or equal to 0 mol %, greater than or equal to 0.01 mol %, greater than or equal to 0.1 mol %, or even greater than or equal to 0.2 mol %. In embodiments, the concentration of $ZrO_2$ in the glass composition may be less than or equal to 2 mol %, less than or equal to 1.5 mol %, less than or equal to 1 mol %, less than or equal to 0.75 mol %, or even less than or equal to 0.5 mol %. In embodiments, the concentration of $ZrO_2$ in the glass composition may be greater than or equal to 0 mol % and less than or equal to 2 mol %, greater than or equal to 0 mol % and less than or equal to 1.5 mol %, greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0.01 mol % and less than or equal to 2 mol %, greater than or equal to 0.01 mol % and less than or equal to 1.5 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.5 mol %, greater than or equal to 0.1 mol % and less than or equal to 2 mol %, greater than or equal to 0.1 mol % and less than or equal to 1.5 mol %, greater than or equal to 0.1 mol % and less than or equal to 1 mol %, greater than or equal to 0.1 mol % and less than or equal to 0.75 mol %, greater than or equal to 0.1 mol % and less than or equal to 0.5 mol %, greater than or equal to 0.2 mol % and less than or equal to 2 mol %, greater than or equal to 0.2 mol % and less than or equal to 1.5 mol %, greater than or equal to 0.2 mol % and less than or equal to 1 mol %, greater than or equal to 0.2 mol % and less than or equal to 0.75 mol %, or even greater than or equal to 0.2 mol % and less than or equal to 0.5 mol %, or any and all sub-ranges formed from any of these endpoints. In embodiments, the glass composition and the resultant colored glass article may be substantially free or free of $ZrO_2$.

The glass compositions and the resultant colored glass articles described herein may further comprise $Fe_2O_3$. $Fe_2O_3$ may also act as a colorant in addition to Au, producing colored glass articles that may, for example, be pink or red in color. In embodiments, the glass composition and the resultant colored glass article may comprise greater than or equal to 0.01 mol % and less than or equal to 1 mol % $Fe_2O_3$. In embodiments, the glass composition and the resultant colored glass article may comprise greater than or equal to 0.05 mol % and less than or equal to 1 mol % $Fe_2O_3$. In embodiments, the concentration of $Fe_2O_3$ in the glass composition may be greater than or equal to 0 mol %, greater than or equal to 0.01 mol %, or even greater than or equal to 0.05 mol %. In embodiments, the concentration of $Fe_2O_3$ in the glass composition may be less than or equal to 1 mol %, less than or equal to 0.75 mol %, less than or equal to 0.5 mol %, or even less than or equal to 0.25 mol %. In embodiments, the concentration of $Fe_2O_3$ in the glass composition may be greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0 mol % and less than or equal to 0.25 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.5 mol %, greater than or equal to 0.01 mol % and less than or equal to 0.25 mol %, greater than or equal to 0.05 mol % and less than or equal to 1 mol %, greater than or equal to 0.05 mol % and less than or equal to 0.75 mol %, greater than or equal to 0.05 mol % and less than or equal to 0.5 mol %, or even greater than or equal to 0.05 mol % and less than or equal to 0.25 mol %, or any and all sub-ranges formed from any of these endpoints. In embodiments, the glass composition and the resultant colored glass article may be substantially free or free of $Fe_2O_3$.

The glass compositions and the resultant colored glass articles described herein may further comprise one or more fining agents. In embodiments, the fining agents may include, for example, $SnO_2$. In embodiments, the glass composition and the resultant colored glass article may comprise greater than or equal to 0.01 mol % and less than or equal to 1 mol % $SnO_2$. In embodiments, the glass composition and the resultant colored glass article may comprise greater than or equal to 0.05 mol % and less than or equal to 0.75 mol % $SnO_2$. In embodiments, the concentration of $SnO_2$ in the glass composition may be greater than or equal to 0 mol %, greater than or equal 0.01 mol % or greater than or equal to 0.05 mol %. In embodiments, the concentration of $SnO_2$ in the glass composition may less than or equal to 1 mol %, less than or equal to 0.75 mol %, less than or equal to 0.5 mol %, or even less than or equal to 0.25 mol %. In embodiments, the concentration of $SnO_2$ in the glass composition may be greater than or equal to 0 mol % and less than or equal to 1 mol %, greater than or equal to 0 mol % and less than or equal to 0.75 mol %, greater than or equal to 0 mol % and less than or equal to 0.5 mol %, greater than or equal to 0 mol % and less than or equal to 0.25 mol %, greater than or equal to 0.01 mol % and less than or equal to 1 mol %, greater than or equal to 0.01 mol % and less than or equal to 0.75 mol %, greater than or equal to 0.01 mol % and less than or equal to 0.5 mol %, greater than or equal to 0.01 mol % and less than or equal to 0.25 mol %, greater than or equal to 0.05 mol % and less than or equal to 1 mol %, greater than or equal to 0.05 mol % and less than or equal to 0.75 mol %, greater than or equal to 0.05 mol % and less than or equal to 0.5 mol %, or even greater than or equal to 0.01 mol % and less than or equal to 0.25 mol %, or any and all sub-ranges formed from any of these endpoints. In embodiments, the glass composition and the resultant colored glass article may be substantially free or free of $SnO_2$.

In embodiments, the glass composition and the resultant colored glass article may include alkaline earth oxides, such as MgO, ZnO, CaO, SrO, and BaO.

In embodiments, the concentration of MgO in the glass composition and the resultant colored glass article may be greater than or equal to 0 mol % or even greater than or equal to 0.5 mol %. In embodiments, the concentration of MgO in the glass composition and the resultant colored glass article may be less than or equal to 2 mol % or even less than or equal to 1 mol %. In embodiments, the concentration of MgO in the glass composition and the resultant colored glass article may be greater than or equal to 0 mol % and less than or equal to 2 mol %, greater than or equal to 0 mol % and less than or equal to 1 mol %, greater than or equal to 0.5 mol % and less than or equal to 2 mol %, or even greater than or equal to 0.5 mol % and less than or equal to 1 mol %, or any and all sub-ranges formed from any of these endpoints. In embodiments, the glass composition and the resultant colored glass article may be substantially free or free of MgO.

In embodiments, the concentration of ZnO in the glass composition and the resultant colored glass article may be greater than or equal to 0 mol % or even greater than or equal to 0.5 mol %. In embodiments, the concentration of ZnO in the glass composition and the resultant colored glass article may be less than or equal to 2 mol % or even less than or equal to 1 mol %. In embodiments, the concentration of ZnO in the glass composition and the resultant colored glass article may be greater than or equal to 0 mol % and less than or equal to 2 mol %, greater than or equal to 0 mol % and less than or equal to 1 mol %, greater than or equal to 0.5 mol % and less than or equal to 2 mol %, or even greater than or equal to 0.5 mol % and less than or equal to 1 mol %, or any and all sub-ranges formed from any of these endpoints. In embodiments, the glass composition and the resultant colored glass article may be substantially free or free of ZnO.

In embodiments, the concentration of CaO in the glass composition and the resultant colored glass article may be greater than or equal to 0 mol % or even greater than or equal to 0.5 mol %. In embodiments, the concentration of CaO in the glass composition and the resultant colored glass article may be less than or equal to 2 mol % or even less than or equal to 1 mol %. In embodiments, the concentration of CaO in the glass composition and the resultant colored glass article may be greater than or equal to 0 mol % and less than or equal to 2 mol %, greater than or equal to 0 mol % and less than or equal to 1 mol %, greater than or equal to 0.5 mol % and less than or equal to 2 mol %, or even greater than or equal to 0.5 mol % and less than or equal to 1 mol %, or any and all sub-ranges formed from any of these endpoints. In embodiments, the glass composition and the resultant colored glass article may be substantially free or free of CaO.

In embodiments, the concentration of SrO in the glass composition and the resultant colored glass article may be greater than or equal to 0 mol % or even greater than or equal to 0.5 mol %. In embodiments, the concentration of SrO in the glass composition and the resultant colored glass article may be less than or equal to 2 mol % or even less than or equal to 1 mol %. In embodiments, the concentration of SrO in the glass composition and the resultant colored glass article may be greater than or equal to 0 mol % and less than or equal to 2 mol %, greater than or equal to 0 mol % and less than or equal to 1 mol %, greater than or equal to 0.5 mol % and less than or equal to 2 mol %, or even greater than or equal to 0.5 mol % and less than or equal to 1 mol %, or any and all sub-ranges formed from any of these endpoints. In embodiments, the glass composition and the resultant colored glass article may be substantially free or free of SrO.

In embodiments, the concentration of BaO in the glass composition and the resultant colored glass article may be greater than or equal to 0 mol % or even greater than or equal to 0.5 mol %. In embodiments, the concentration of BaO in the glass composition and the resultant colored glass article may be less than or equal to 2 mol % or even less than or equal to 1 mol %. In embodiments, the concentration of BaO in the glass composition and the resultant colored glass article may be greater than or equal to 0 mol % and less than or equal to 2 mol %, greater than or equal to 0 mol % and less than or equal to 1 mol %, greater than or equal to 0.5 mol % and less than or equal to 2 mol %, or even greater than or equal to 0.5 mol % and less than or equal to 1 mol %, or any and all sub-ranges formed from any of these endpoints. In embodiments, the glass composition and the resultant colored glass article may be substantially free or free of BaO.

In embodiments, the glass composition and the resultant colored glass article may include Cl, which may enable growth of particular Au particles. In embodiments, the concentration of Cl in the glass composition and the resultant colored glass article may be greater than or equal to 0 mol % or even greater than or equal to 0.1 mol %. In embodiments, the concentration of Cl in the glass composition and the resultant colored glass article may be less than or equal to 0.5 mol % or even less than or equal to 0.25 mol %. In embodiments, the concentration of Cl in the glass composition and the resultant colored glass article may be greater than or equal to 0 mol % and less than or equal to 0.5 mol %, greater than or equal to 0 mol % and less than or equal to 0.25 mol %, greater than or equal to 0.1 mol % and less than or equal to 0.5 mol %, or even greater than or equal to 0.1 mol % and less than or equal to 0.25 mol %, or any and all sub-ranges formed from any of these endpoints. In embodiments, the glass composition and the resultant colored glass article may be substantially free or free of Cl.

In embodiments, the glass composition and the resultant colored glass article may be substantially free or free of MgO, CaO, ZnO, Cl, or combinations thereof.

The glass compositions and the resultant colored glass articles described herein further comprise Au as a colorant to achieve the desired color. In embodiments, the glass composition and the resultant colored glass article may comprise greater than or equal to $1 \times 10^{-6}$ mol % and less than or equal to 1 mol % Au. In embodiments, the glass composition and the resultant colored glass article may comprise greater than or equal to 0.0001 mol % and less than or equal to 0.1 mol % Au. In embodiments, the concentration of Au in the glass composition and the resultant colored glass article may be greater than or equal to $1 \times 10^{-6}$ mol %, greater than or equal to $1 \times 10^{5}$ mol %, greater than or equal to 0.0001 mol %, greater than or equal to 0.0005 mol %, or even greater than or equal to 0.001 mol %. In embodiments, the concentration of Au in the glass composition and the resultant colored glass article may be less than or equal to 1 mol %, less than or equal to 0.75 mol %, less than or equal to 0.5 mol %, less than or equal to 0.25 mol %, less than or equal to 0.1 mol %, less than or equal to 0.05 mol %, or even less than or equal to 0.01. In embodiments, the concentration of Au in the glass composition and the resultant colored glass article may be greater than or equal to $1 \times 10^{-6}$ mol % and less than or equal to 0.75 mol %, greater than or equal to $1 \times 10^{-6}$ mol % and less than or equal to 0.5 mol %, greater than or equal to $1 \times 10^{-6}$ mol % and less than or equal to 0.25 mol %, greater than or equal to $1 \times 10^{-6}$ mol % and less than or equal to 0.1 mol %, greater than or equal to $1 \times 10^{-6}$ mol % and less than or equal to 0.05 mol %, greater than or equal to $1 \times 10^{-6}$ mol % and less than or equal to 0.01 mol %, greater than or equal to $1 \times 10^{-5}$ mol % and less than or equal to 1 mol %, greater than or equal to $1 \times 10^{-5}$ mol % and less than or equal to 0.75 mol %, greater than or equal to $1 \times 10^{-5}$ mol % and less than or equal to 0.5 mol %, greater than or equal to $1 \times 10^{-5}$ mol % and less than or equal to 0.25 mol %, greater than or equal to $1 \times 10^{-5}$ mol % and less than or equal to 0.1 mol %, greater than or equal to $1 \times 10^{-5}$ mol % and less than or equal to 0.05 mol %, greater than or equal to $1 \times 10^{-5}$ mol % and less than or equal to 0.01 mol %, greater than or equal to 0.0001 mol % and less than or equal to 1 mol %, greater than or equal to 0.0001 mol % and less than or equal to 0.75 mol %, greater than or equal to 0.0001 mol % and less than or equal to 0.5 mol %, greater than or equal to 0.0001 mol % and less than or equal to 0.25 mol %, greater than or equal to 0.0001 mol % and less than or equal to 0.1 mol %, greater than or equal to 0.0001 mol % and less than or equal to 0.05 mol %, greater than or equal to 0.0001 mol % and less than or equal to 0.01 mol %, greater than or equal to 0.0005 mol % and less than or equal to 1 mol %, greater than or equal to 0.0005 mol % and less than or equal to 0.75 mol %, greater than or equal to 0.0005 mol % and less than or equal to 0.5 mol %, greater than or equal to 0.0005 mol % and less than or equal to 0.25 mol %, greater than or equal to 0.0005 mol % and less than or equal to 0.1 mol %, greater than or equal to 0.0005 mol % and less than or equal to 0.05 mol %, greater than or equal to 0.0005 mol % and less than or equal to 0.01 mol %, greater than or equal to 0.001 mol % and less than or equal to 1 mol %, greater than or equal to 0.001 mol % and less than or equal to 0.75 mol %, greater than or equal to 0.001 mol % and less than or equal to 0.5 mol %, greater than or equal to 0.001 mol % and less than or equal to 0.25 mol %, greater than or equal to 0.001 mol % and less than or equal to 0.1 mol %, greater than or equal to 0.001 mol % and less than or equal to 0.05 mol %, or even greater than or equal to 0.001 mol % and less than or equal to 0.01 mol %, or any and all sub-ranges formed from any of these endpoints.

In embodiments, the glass compositions and the resultant colored glass articles described herein may further include tramp materials such as $TiO_2$, MnO, $MoO_3$, $WO_3$, $Y_2O_3$, CdO, $As_2O_3$, sulfur-based compounds, such as sulfates, halogens, or combinations thereof. In embodiments, the glass composition and the resultant colored glass article may be substantially free or free of tramp materials such as $TiO_2$, MnO, $MoO_3$, $WO_3$, $Y_2O_3$, CdO, $As_2O_3$, sulfur-based compounds, such as sulfates, halogens, or combinations thereof.

In embodiments, antimicrobial components, chemical fining agents, or other additional components may be included in the glass compositions and the resultant colored glass articles.

In embodiments, the viscosity of the glass composition may be adjusted to prevent devitrification of the glass composition and formation of Au particles during melting and forming. Formation of Au particles before melting may limit the color gamut that may be achieved by heat treatment. Accordingly, in embodiments, to achieve the desired viscosity and thereby prevent formation of Au particles before melting, the glass compositions and the resultant glass articles described herein may satisfy the relationship $5.72*Al_2O_3$ (mol %)–$21.4*ZnO$ (mol %)–$2.5*P_2O_5$ (mol %)–$35*Li_2O$ (mol %)–$16.6*B_2O_3$ (mol %)–$20.5*MgO$ (mol %)–$23.3*Na_2O$ (mol %)–$27.9*SrO$ (mol %)–$18.5*K_2O$ (mol %)–$26.3*CaO$ (mol %) is greater than −609 mol %. In embodiments, the glass compositions and the resultant glass articles described herein may satisfy the relationship $5.72*Al_2O_3$ (mol %)–$21.4*ZnO$ (mol %)–$2.5*P_2O_5$ (mol %)–$35*Li_2O$ (mol %)–$16.6*B_2O_3$ (mol %)–$20.5*MgO$ (mol %)–$23.3*Na_2O$ (mol %)–$27.9*SrO$ (mol %)–$18.5*K_2O$ (mol %)–$26.3*CaO$ (mol %) is greater than −609 mol %, greater than or equal to −575 mol %, greater than or equal to −550 mol %, or even greater than or equal to −525 mol %. In embodiments, the glass compositions and the resultant glass articles described herein may satisfy the relationship $5.72*Al_2O_3$ (mol %)–$21.4*ZnO$ (mol %)–$2.5*P_2O_5$ (mol %)–$35*Li_2O$ (mol %)–$16.6*B_2O_3$ (mol %)–$20.5*MgO$ (mol %)–$23.3*Na_2O$ (mol %)–$27.9*SrO$ (mol %)–$18.5*K_2O$ (mol %)–$26.3*CaO$ (mol %) is less than or equal to −400 mol %, less than or equal to −425 mol %, or even less than or equal to −450 mol %. In embodiments, the glass compositions and the resultant glass articles described herein may satisfy the relationship $5.72*Al_2O_3$ (mol %)–$21.4*ZnO$ (mol %)–$2.5*P_2O_5$ (mol %)–$35*Li_2O$ (mol %)–$16.6*B_2O_3$ (mol %)–$20.5*MgO$ (mol %)–$23.3*Na_2O$ (mol %)–$27.9*SrO$ (mol %)–$18.5*K_2O$ (mol %)–$26.3*CaO$ (mol %) is greater than −609 mol % and less than or equal to −400 mol %, greater then −609 mol % and less than or equal to −425 mol %, greater than −609 mol % and less than or equal to −450 mol %, greater than or equal to −575 mol % and less than or equal to −400 mol %, greater than or equal to −575 mol % and less than or equal to −425 mol %, greater than or equal to −575 mol % and less than or equal to −450 mol %, greater than or equal to −550 mol % and less than or equal to −400 mol %, greater than or equal to −550 mol % and less than or equal to −425 mol %, greater than or equal to −550 mol % and less than or equal to −450 mol %, greater than or equal to −525 mol % and less than or equal to −400 mol %, greater than or equal to −525 mol % and less than or equal to −425 mol %, or even greater than or equal to −525 mol % and less than or equal to −450 mol %, or any and all sub-ranges formed from any of these endpoints.

In embodiments, the process for making a glass article includes heat treating a glass composition described herein at one or more preselected temperatures for one or more preselected times to induce glass homogenization. In embodiments, the heat treatment for making a glass article may include (i) heating a glass composition at a rate of 1-100° C./min to glass homogenization temperature; (ii) maintaining the glass composition at the glass homogenization temperature for a time greater than or equal to 0.25 hour and less than or equal to 4 hours to produce a glass article; and (iii) cooling the formed glass article to room temperature. In embodiments, the glass homogenization temperature may be greater than or equal to 300° C. and less than or equal to 700° C.

The glass compositions described herein include Au, $R_2O$, and $Al_2O_3$. The concentrations of $R_2O$ and $Al_2O_3$ may be adjusted such that the difference $R_2O$—$Al_2O_3$, in combination with Au, produces colored glass articles having the desired color (e.g., pink, purple, red, or orange). In embodiments, the colored glass article may have a transmittance color coordinate in the CIELAB color space, as measured at an article thickness of 1.33 mm under F2 illumination and a 10° standard observer angle, of: L* greater than or equal to 50 and less than or equal to 100; a* greater than or equal to −15 and less than or equal to 25; and b* greater than or equal to −25 and less than or equal to 25.

Relatively smaller concentrations of $R_2O$—$Al_2O_3$ (e.g., less than or equal to 1.5 mol %) may result in a blue or purple glass article. Relatively higher concentrations of $R_2O$—$Al_2O_3$ (e.g., greater than 1.5 mol %) may result in an orange or red glass article.

For example, in embodiments, $R_2O$—$Al_2O_3$ may be greater than or equal to −5 mol % and less than or equal to 1.5 mol % and b* may be greater than or equal to −25 and less than or equal to 10. In embodiments, $R_2O$—$Al_2O_3$ may greater than or equal to −3 mol % and less than or equal to 1.5 mol % and b* may be greater than or equal to −15 and less than or equal to 7. In embodiments, $R_2O$—$Al_2O_3$ may be greater than or equal to −5 mol % and less than or equal to 1.5 mol %, greater than or equal to −3 mol % and less than or equal to 1.5 mol %, greater than or equal to −1 mol % and less than or equal to 1.5 mol %, or even greater than or equal to 0 mol % and less than or equal to 1.5 mol %, or any and all sub-ranges formed from any of these endpoints; and b* may be greater than or equal to −25 and less than or equal to 10, greater than or equal to −25 and less than or equal to 7, greater than or equal to −25 and less than or equal to 5, greater than or equal to −15 and less than or equal to 10, greater than or equal to −15 and less than or equal to 7, greater than or equal to −15 and less than or equal to 5, greater than or equal to −10 and less than or equal to 10, greater than or equal to −10 and less than or equal to 7, or even greater than or equal to −10 and less than or equal to 5, or any and all sub-ranges formed from any of these endpoints.

In embodiments, $R_2O$—$Al_2O_3$ may be greater than 1.5 mol % and less than or equal to 7 mol % and b* may be greater than or equal to 0 and less than or equal to 25. In embodiments, $R_2O$—$Al_2O_3$ may be greater than 1.5 mol % and less than or equal to 5 mol % and b* may be greater than or equal to 0 and less than or equal to 15. In embodiments, $R_2O$—$Al_2O_3$ may be greater than 1.5 mol % and less than or equal to 7 mol %, greater than 1.5 mol % and less than or equal to 5 mol %, or even greater than 1.5 mol % and less than or equal to 3 mol %, or any and all sub-ranges formed from any of these endpoints; and b* may be greater than or equal to 0 and less than or equal to 25, greater than or equal to 0 and less than or equal to 15, greater than or equal to 0 and less than or equal to 10, greater than or equal to 2.5 and less than or equal to 25, greater than or equal to 2.5 and less than or equal to 15, greater than or equal to 2.5 and less than or equal to 10, greater than or equal to 5 and less than or equal to 25, greater than or equal to 5 and less than or equal to 15, or even greater than or equal to 5 and less than or equal to 10, or any and all sub-ranges formed from any of these endpoints.

In embodiments, the glass composition and the resultant colored glass article may comprise greater than or equal to 60 mol % and less than or equal to 70 mol % $SiO_2$; greater than or equal to 11 mol % and less than or equal to 17 mol % $Al_2O_3$; greater than or equal to 2 mol % and less than or equal to 8 mol % $B_2O_3$; greater than or equal to 9 mol % and less than or equal to 14 mol % $Li_2O$; greater than or equal to 2 mol % and less than or equal to 6 mol % $Na_2O$; greater than or equal to 0.1 mol % and less than or equal to 0.5 mol % $K_2O$; and greater than or equal to $1\times10^{-6}$ mol % and less than or equal to 0.05 mol % Au. In these embodiments, $R_2O$—$Al_2O_3$ is greater than or equal to 0 mol % and less than or equal to 3 mol %, $R_2O$ being the sum of $Li_2O$, $Na_2O$, and $K_2O$.

Different color coordinates within the color gamut may be achieved by altering the heat treatment cycle used to produce the resultant colored glass articles. The heat treatment cycle is characterized by the temperature of the environment (i.e., the oven) and the duration of the cycle (i.e., the time the glass article is exposed to the heated environment). As used herein, the phrase "temperature of the heat treatment cycle" refers to the temperature of the environment (i.e., the oven). In embodiments, glass articles formed from the glass compositions described herein are heat treated in an isothermal oven to produce the resultant colored glass articles.

In embodiments, the temperature of the heat treatment cycle is greater than or equal to 500° C., greater than or equal to 550° C., greater than or equal to 575° C., greater than or equal to 600° C., greater than or equal to 625° C., or even greater than or equal to 650° C. In embodiments, the temperature of the heat treatment cycle is less than or equal to 800° C., less than or equal to 775° C., less than or equal to 750° C., less than or equal to 725° C., or even less than or equal to 700° C. In embodiments, the temperature of the heat treatment cycle is greater than or equal to 500° C. and less than or equal to 800° C., greater than or equal to 500° C. and less than or equal to 775° C., greater than or equal to 500° C. and less than or equal to 750° C., greater than or equal to 500° C. and less than or equal to 725° C., greater than or equal to 550° C. and less than or equal to 700° C., greater than or equal to 550° C. and less than or equal to 800° C., greater than or equal to 550° C. and less than or equal to 775° C., greater than or equal to 550° C. and less than or equal to 750° C., greater than or equal to 550° C. and less than or equal to 725° C., greater than or equal to 550° C. and less than or equal to 700° C., greater than or equal to 575° C. and less than or equal to 800° C., greater than or equal to 575° C. and less than or equal to 775° C., greater than or equal to 575° C. and less than or equal to 750° C., greater than or equal to 575° C. and less than or equal to 725° C., greater than or equal to 575° C. and less than or equal to 700° C., greater than or equal to 600° C. and less than or equal to 800° C., greater than or equal to 600° C. and less than or equal to 775° C., greater than or equal to 600° C. and less than or equal to 750° C., greater than or equal to 600° C. and less than or equal to 725° C., greater than or equal to 600° C. and less than or equal to 700° C., greater than or equal to 625° C. and less than or equal to 800° C., greater than or equal to 625° C. and less than or equal to 775° C., greater than or equal to 625° C. and less than or equal to 750° C., greater than or equal to 625° C. and less than or equal to 725° C., greater than or equal to 625° C. and less than or equal to 700° C., greater than or equal to 650° C. and less than or equal to 800° C., greater than or equal to 650° C. and less than or equal to 775° C., greater than or equal to 650° C. and less than or equal to 750° C., greater than or equal to 650° C. and less than or equal to 725° C., or even greater than or equal to 650° C. and less than or equal to 700° C., or any and all sub-ranges formed from any of these endpoints.

In embodiments, the duration of the heat treatment cycle is greater than or equal to 0.25 hour, greater than or equal to 0.5 hour, greater than or equal 1 hour, or even greater than or equal to 2 hours. In embodiments, the durations of the heat treatment cycle is less than or equal to 24 hours, less than or equal to 16 hours, less than or equal to 8 hours, or even less than or equal to 4 hours. In embodiments, the duration of the heat treatment cycle is greater than or equal to 0.25 hour and less than or equal to 24 hours, greater than or equal to 0.25 hour and less than or equal to 16 hours, greater than or equal to 0.25 hour and less than or equal to 8 hours, greater than or equal to 0.25 hour and less than or equal to 4 hours, greater than or equal to 0.5 hour and less than or equal to 24 hours, greater than or equal to 0.5 hour and less than or equal to 16 hours, greater than or equal to 0.5 hour and less than or equal to 8 hours, greater than or equal to 0.5 hour and less than or equal to 4 hours, greater than or equal to 1 hour and less than or equal to 24 hours, greater than or equal to 1 hour and less than or equal to 16 hours, greater than or equal to 1 hour and less than or equal to 8 hours, greater than or equal to 1 hour and less than or equal to 4 hours, greater than or equal to 2 hours and less than or equal to 24 hours, greater than or equal to 2 hours and less than or equal to 16 hours, greater than or equal to 2 hours and less than or equal to 8 hours, or even greater than or equal to 2 hours and less than or equal to 4 hours, or any and all sub-ranges formed from any of these endpoints.

The colored glass articles formed from the glass compositions described herein may be any suitable thickness, which may vary depending on the particular application of the colored glass article. In embodiments, the colored glass articles may have a thickness greater than or equal to 250 µm and less than or equal to 6 mm, greater than or equal to 250 µm and less than or equal to 4 mm, greater than or equal to 250 µm and less than or equal to 2 mm, greater than or equal to 250 µm and less than or equal to 1 mm, greater than or equal to 250 µm and less than or equal to 750 µm, greater than or equal to 250 µm and less than or equal to 500 µm, greater than or equal to 500 µm and less than or equal to 6 mm, greater than or equal to 500 µm and less than or equal to 4 mm, greater than or equal to 500 µm and less than or equal to 2 mm, greater than or equal to 500 µm and less than or equal to 1 mm, greater than or equal to 500 µm and less than or equal to 750 µm, greater than or equal to 750 µm and less than or equal to 6 mm, greater than or equal to 750 µm and less than or equal to 4 mm, greater than or equal to 750 µm and less than or equal to 2 mm, greater than or equal to 750 µm and less than or equal to 1 mm, greater than or equal to 1 mm and less than or equal to 6 mm, greater than or equal to 1 mm and less than or equal to 4 mm, greater than or equal to 1 mm and less than or equal to 2 mm, greater than or equal to 2 mm and less than or equal to 6 mm, greater than or equal to 2 mm and less than or equal to 4 mm, or even greater than or equal to 4 mm and less than or equal to 6 mm, or any and all sub-ranges formed from any of these endpoints.

As discussed hereinabove, colored glass articles formed from the glass compositions described herein may have an increased fracture toughness such that the colored glass articles are more resistant to damage. In embodiments, the colored glass article may have a $K_{1c}$ fracture toughness, as measured by a CNSB method, prior to ion-exchange, greater than or equal to 0.7 MPa·m$^{1/2}$. In embodiments, the colored glass article may have a $K_{1c}$ fracture toughness, prior to ion-exchange, as measured by a CNSB method greater than or equal to 0.7 MPa·m$^{1/2}$ greater than or equal to 0.8 MPa·m$^{1/2}$, greater than or equal to 0.9 MPa·m$^{1/2}$, or even greater than or equal to 1.0 MPa·m$^{1/2}$.

In embodiments, the glass compositions described herein are ion-exchangeable to facilitate strengthening the colored glass article made from the glass compositions. In typical ion-exchange processes, smaller metal ions in the glass compositions are replaced or "exchanged" with larger metal ions of the same valence within a layer that is close to the outer surface of the colored glass article made from the glass composition. The replacement of smaller ions with larger ions creates a compressive stress within the layer of the colored glass article made from the glass composition. In embodiments, the metal ions are monovalent metal ions (e.g., Li$^+$, Na$^+$, K$^+$, and the like), and ion-exchange is accomplished by immersing the glass article made from the glass composition in a bath comprising at least one molten salt of the larger metal ion that is to replace the smaller metal ion in the colored glass article. Alternatively, other monovalent ions such as Ag$^+$, Tl$^+$, Cu$^+$, and the like may be exchanged for monovalent ions. The ion-exchange process or processes that are used to strengthen the colored glass article made from the glass composition may include contacting the colored glass article with an ion-exchange medium. In embodiments, the ion-exchange medium may be a molten salt bath. For example, the ion-exchange process may include, but is not limited to, immersion in a single bath or multiple baths of like or different compositions with optional washing and/or annealing steps between immersions.

Upon exposure to the colored glass article, the ion exchange solution (e.g., KNO$_3$ and/or NaNO$_3$ molten salt bath) may, according to embodiments, be at a temperature greater than or equal to 350° C. and less than or equal to 500° C., greater than or equal to 360° C. and less than or equal to 450° C., greater than or equal to 370° C. and less than or equal to 440° C., greater than or equal to 360° C. and less than or equal to 420° C., greater than or equal to 370° C. and less than or equal to 400° C., greater than or equal to 375° C. and less than or equal to 475° C., greater than or equal to 400° C. and less than or equal to 500° C., greater than or equal to 410° C. and less than or equal to 490° C., greater than or equal to 420° C. and less than or equal to 480° C., greater than or equal to 430° C. and less than or equal to 470° C., or even greater than or equal to 440° C. and less than or equal to 460° C., or any and all sub-ranges between the foregoing values. In embodiments, the colored glass article may be exposed to the ion exchange solution for a duration greater than or equal to 2 hours and less than or equal to 24 hours, greater than or equal to 2 hours and less than or equal to 12 hours, greater than or equal to 2 hours and less than or equal to 6 hours, greater than or equal to 8 hours and less than or equal to 24 hours, greater than or equal to 6 hours and less than or equal to 24 hours, greater than or equal to 6 hours and less than or equal to 12 hours, greater than or equal to 8 hours and less than or equal to 24 hours, or even greater than or equal to 8 hours and less than or equal to 12 hours, or any and all sub-ranges formed from any of these endpoints.

In embodiments, a colored glass article made from a glass composition may be ion-exchanged to achieve a depth of compression 10 μm or greater, 20 μm or greater, 30 μm or greater, 40 μm or greater, 50 μm or greater, 60 μm or greater, 70 μm or greater, 80 μm or greater, 90 μm or greater, or 100 μm or greater. In embodiments, the colored glass article made from the glass composition may have a thickness "t" and may be ion-exchanged to achieve a depth of compression greater than or equal to 0.15 t, greater than or equal to 0.17 t, or even greater than or equal to 0.2 t. In embodiments, the colored glass article made from the glass composition may have a thickness "t" and may be ion-exchanged to achieve a depth of compression less than or equal to 0.3 t, less than or equal to 0.27 t, or even less than or equal to 0.25 t. In embodiments, the colored glass article made from the glass composition described herein may have a thickness "t" and may be ion-exchanged to achieve a depth of compression greater than or equal to 0.15 t and less than or equal to 0.3 t, greater than or equal to 0.15 t and less than or equal to 0.27 t, greater than or equal to 0.15 t and less than or equal to 0.25 t, greater than or equal to 0.17 t and less than or equal to 0.3 t, greater than or equal to 0.17 t and less than or equal to 0.27 t, greater than or equal to 0.17 t and less than or equal to 0.25 t, greater than or equal to 0.2 t and less than or equal to 0.3 t, greater than or equal to 0.2 t and less than or equal to 0.27 t, or even greater than or equal to 0.2 t and less than or equal to 0.25 t, or any and all sub-ranges formed from any of these endpoints.

The development of this surface compression layer is beneficial for achieving a better crack resistance and higher flexural strength compared to non-ion-exchanged materials. The surface compression layer has a higher concentration of the ions exchanged into the colored glass article in comparison to the concentration of the ions exchanged into the colored glass article for the body (i.e., the area not including the surface compression) of the colored glass article. In embodiments, the colored glass article made from the glass composition may have a surface compressive stress after ion-exchange strengthening greater than or equal to 300 MPa, greater than or equal to 400 MPa, greater than or equal to 500 MPa, or even greater than or equal to 600 MPa. In embodiments, the colored glass article made from the glass composition may have a surface compressive stress after ion-exchange strengthening less than or equal to 1 GPa, less than or equal to 900 MPa, or even less than or equal to 800 MPa. In embodiments, the colored glass article made from the glass composition may have a surface compressive stress after ion-exchange strengthening greater than or equal to 300 MPa and less than or equal to 1 GPa, greater than or equal to 300 MPa and less than or equal to 900 MPa, greater than or equal to 300 MPa and less than or equal to 800 MPa, greater than or equal to 400 MPa and less than or equal to 1 GPa, greater than or equal to 400 MPa and less than or equal to 900 MPa, greater than or equal to 400 MPa and less than or equal to 800 MPa, greater than or equal to 500 MPa and less than or equal to 1 GPa, greater than or equal to 500 MPa and less than or equal to 900 MPa, greater than or equal to 500 MPa and less than or equal to 800 MPa, greater than or equal to 600 MPa and less than or equal to 1 GPa, greater than or equal to 600 MPa and less than or equal to 900 MPa, greater than or equal to 600 MPa and less than or equal to 800 MPa, In embodiments, the colored glass articles made from the glass composition may have a maximum central tension after ion-exchange strengthening greater than or equal to 40 MPa, greater than or equal to 60 MPa, greater than or equal to 80 MPa, or even greater than or equal to 100 MPa. In embodiments, the colored glass article made from the glass composition may have a maximum central tension after ion-exchange strengthening less than or equal to 250 MPa, less than or equal to 200 MPa, or even less than or equal to 150 MPa. In embodiments, the colored glass article made from the glass composition may have a maximum central tension after ion-exchange strengthening greater than or equal to 40 MPa and less than or equal to 250 MPa, greater than or equal to 40 MPa and less than or equal to 200 MPa, greater than or equal to 40 MPa and less than or equal to 150 MPa, greater than or equal to 60 MPa and less than or equal to 250 MPa, greater than or equal to 60 MPa and less than or equal to 200 MPa, greater than or equal to 60 MPa and less than or equal to 150 MPa, greater than or equal to 80 MPa and less than or equal to 250 MPa, greater than or equal to 80 MPa and less than or equal to 200 MPa, greater than or equal to 80 MPa and less than or equal to 150 MPa, greater than or equal to 100 MPa and less than or equal to 250 MPa, greater than or equal to 100 MPa and less than or equal to 200 MPa, or even greater than or equal to 100 MPa and less than or equal to 150 MPa, or any and all sub-ranges formed from any of these endpoints. As utilized herein, central tension refers to a maximum central tension value unless otherwise indicated.

Figure 2:
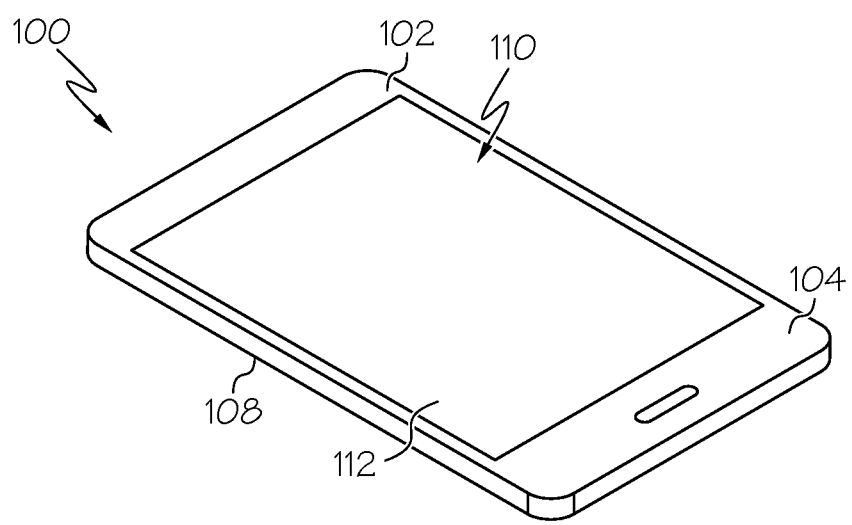
FIG. 2 is a perspective view of the electronic device of FIG. 1.

The colored glass articles described herein may be used for a variety of applications including, for example, back cover applications in consumer or commercial electronic devices such as smartphones, tablet computers, personal computers, ultrabooks, televisions, and cameras. An exemplary article incorporating any of the colored glass articles disclosed herein is shown in FIGS. 1 and 2. Specifically, FIGS. 1 and 2 show a consumer electronic device 100 including a housing 102 having front 104, back 106, and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In embodiments, at least a portion of housing 102, such as the back 106, may include any of the colored glass articles disclosed herein.

Examples

In order that various embodiments be more readily understood, reference is made to the following examples, which illustrate various embodiments of the colored glass articles described herein.

Table 1 shows example compositions C1-C26, with the analyzed concentration (in terms of mol %) of the resultant colored glass articles.

TABLE 1

| Composition | C1 | C2 | C3 | C4 | C5 | C6 |
|---|---|---|---|---|---|---|
| $SiO_2$ | 61.21 | 61.94 | 62.86 | 61.81 | 61.91 | 61.36 |
| $Al_2O_3$ | 14.46 | 14.48 | 14.52 | 15.56 | 15.54 | 15.75 |
| $B_2O_3$ | 5.84 | 5.95 | 5.92 | 5.88 | 5.89 | 5.91 |
| $Li_2O$ | 11.79 | 10.95 | 11.01 | 11.05 | 11.02 | 11.17 |
| $Na_2O$ | 6.34 | 6.32 | 5.34 | 5.34 | 5.34 | 5.42 |
| $K_2O$ | 0.19 | 0.19 | 0.19 | 0.19 | 0.19 | 0.19 |
| MgO | 0.01 | 0.02 | 0.01 | 0.02 | 0.02 | 0.02 |
| CaO | — | — | — | — | — | — |
| ZnO | — | — | — | — | — | — |
| $ZrO_2$ | — | — | — | — | — | — |
| $SnO_2$ | 0.11 | 0.11 | 0.10 | 0.11 | 0.05 | 0.06 |
| $Fe_2O_3$ | — | — | — | — | — | 0.07 |
| Cl | 0.02 | 0.03 | 0.02 | 0.03 | 0.02 | 0.02 |
| Au | 0.0005 | 0.0007 | 0.0009 | 0.0008 | 0.0007 | 0.0005 |
| $R_2O$ | 18.32 | 17.46 | 16.54 | 16.58 | 16.55 | 16.78 |
| $R_2O$—$Al_2O_3$ | 3.86 | 2.98 | 2.02 | 1.02 | 1.01 | 1.03 |
| 5.72*$Al_2O_3$—21.4*ZnO—2.5*$P_2O_5$—35*$Li_2O$—16.6*$B_2O_3$—20.5*MgO—23.3*$Na_2O$—27.9*SrO—18.5*$K_2O$—26.3*CaO | −578.32 | −550.38 | −528.71 | −523.70 | −522.93 | −529.18 |

| Composition | C7 | C8 | C9 | C10 | C11 | C12 |
|---|---|---|---|---|---|---|
| $SiO_2$ | 61.24 | 60.87 | 60.67 | 60.54 | 60.56 | 60.70 |
| $Al_2O_3$ | 15.66 | 16.54 | 16.47 | 16.52 | 16.36 | 16.27 |
| $B_2O_3$ | 5.89 | 5.85 | 5.84 | 5.99 | 6.04 | 6.01 |
| $Li_2O$ | 11.15 | 11.08 | 10.97 | 11.06 | 11.13 | 11.12 |
| $Na_2O$ | 5.38 | 5.34 | 5.35 | 5.27 | 5.28 | 5.28 |
| $K_2O$ | 0.19 | 0.19 | 0.19 | 0.20 | 0.20 | 0.19 |
| MgO | 0.01 | 0.02 | 0.02 | 0.02 | 0.02 | 0.02 |
| CaO | — | — | — | — | — | — |
| ZnO | — | — | — | — | — | — |
| $ZrO_2$ | 0.32 | — | 0.31 | 0.32 | 0.32 | 0.32 |
| $SnO_2$ | 0.05 | 0.06 | 0.05 | 0.05 | 0.05 | 0.05 |
| $Fe_2O_3$ | 0.07 | — | 0.07 | — | — | — |
| Cl | 0.02 | 0.02 | 0.02 | — | — | — |
| Au | 0.0005 | 0.0007 | 0.0005 | 0.0007 | 0.0008 | 0.0008 |
| $R_2O$ | 16.72 | 16.61 | 16.51 | 16.53 | 16.61 | 16.59 |
| $R_2O$—$Al_2O_3$ | 1.06 | 0.07 | 0.04 | 0.01 | 0.25 | 0.32 |
| 5.72*$Al_2O_3$—21.4*ZnO—2.5*$P_2O_5$—35*$Li_2O$—16.6*$B_2O_3$—20.5*MgO—23.3*$Na_2O$—27.9*SrO—18.5*$K_2O$—26.3*CaO | −527.52 | −518.65 | −515.27 | −518.94 | −523.37 | −522.85 |

TABLE 1-continued

| Composition | C13 | C14 | C15 | C16 | C17 | C18 |
|---|---|---|---|---|---|---|
| $SiO_2$ | 60.64 | 60.64 | 63.76 | 65.01 | 65.86 | 67.01 |
| $Al_2O_3$ | 16.07 | 15.42 | 14.39 | 14.29 | 14.28 | 13.47 |
| $B_2O_3$ | 6.01 | 6.04 | 5.86 | 5.09 | 4.36 | 4.13 |
| $Li_2O$ | 11.37 | 11.50 | 11.02 | 10.96 | 10.95 | 10.92 |
| $Na_2O$ | 5.28 | 5.76 | 4.24 | 4.23 | 4.22 | 4.20 |
| $K_2O$ | 0.19 | 0.19 | 0.14 | 0.14 | 0.14 | 0.14 |
| MgO | 0.02 | 0.02 | 0.04 | 0.03 | 0.02 | 0.02 |
| CaO | — | — | — | — | 0.01 | 0.01 |
| ZnO | — | — | 0.02 | — | — | — |
| $ZrO_2$ | 0.32 | 0.32 | 0.48 | 0.20 | 0.10 | 0.04 |
| $SnO_2$ | 0.05 | 0.05 | 0.04 | 0.04 | 0.04 | 0.04 |
| $Fe_2O_3$ | — | — | — | — | — | — |
| Cl | — | — | — | — | — | — |
| Au | 0.0008 | 0.0008 | 0.0011 | 0.0010 | 0.0010 | 0.0010 |
| $R_2O$ | 16.84 | 17.45 | 15.41 | 15.33 | 15.31 | 15.26 |
| $R_2O-Al_2O_3$ | 0.77 | 2.03 | 1.01 | 1.04 | 1.03 | 1.79 |
| $5.72*Al_2O_3-$<br>$21.4*ZnO-$<br>$2.5*P_2O_5-35*Li_2O-$<br>$16.6*B_2O_3-$<br>$20.5*MgO-$<br>$23.3*Na_2O-$<br>$27.9*SrO-18.5*K_2O-$<br>$26.3*CaO$ | −532.74 | −552.69 | −503.22 | −488.03 | −475.55 | −474.86 |

| Composition | C19 | C20 | C21 | C22 |
|---|---|---|---|---|
| $SiO_2$ | 67.59 | 67.75 | 67.84 | 67.89 |
| $Al_2O_3$ | 13.13 | 13.01 | 12.96 | 12.99 |
| $B_2O_3$ | 3.93 | 3.92 | 3.92 | 3.92 |
| $Li_2O$ | 10.94 | 10.91 | 10.88 | 10.77 |
| $Na_2O$ | 4.17 | 4.17 | 4.17 | 4.20 |
| $K_2O$ | 0.14 | 0.14 | 0.14 | 0.14 |
| MgO | 0.02 | 0.02 | 0.01 | 0.01 |
| CaO | 0.01 | 0.01 | 0.01 | 0.01 |
| ZnO | 0.00 | 0.00 | 0.00 | 0.00 |
| $ZrO_2$ | 0.02 | 0.02 | 0.01 | 0.01 |
| $SnO_2$ | 0.04 | 0.04 | 0.04 | 0.04 |
| $Fe_2O_3$ | 0.00 | 0.00 | 0.00 | 0.00 |
| Cl | 0.00 | 0.00 | 0.00 | 0.00 |
| Au | 0.0011 | 0.0014 | 0.0016 | 0.0006 |
| $R_2O$ | 15.25 | 15.22 | 15.20 | 15.11 |
| $R_2O-Al_2O_3$ | 2.13 | 2.21 | 2.24 | 2.12 |
| $5.72*Al_2O_3-$<br>$21.4*ZnO-$<br>$2.5*P_2O_5-35*Li_2O-$<br>$16.6*B_2O_3-$<br>$20.5*MgO-$<br>$23.3*Na_2O-$<br>$27.9*SrO-18.5*K_2O-$<br>$26.3*CaO$ | −473.41 | −473.02 | −472.32 | −468.73 |

| Composition | C23 | C24 | C25 | C26 |
|---|---|---|---|---|
| $SiO_2$ | 67.63 | 63.76 | 65.86 | 67.59 |
| $Al_2O_3$ | 13.15 | 14.39 | 14.28 | 13.13 |
| $B_2O_3$ | 3.94 | 5.86 | 4.36 | 3.93 |
| $Li_2O$ | 10.69 | 11.02 | 10.95 | 10.94 |
| $Na_2O$ | 4.21 | 4.24 | 4.22 | 4.17 |
| $K_2O$ | 0.15 | 0.14 | 0.14 | 0.14 |
| MgO | 0.01 | 0.04 | 0.02 | 0.02 |
| CaO | 0.10 | 0.00 | 0.00 | 0.00 |
| ZnO | 0.00 | 0.02 | 0.00 | 0.00 |
| $ZrO_2$ | 0.02 | 0.48 | 0.10 | 0.02 |
| $SnO_2$ | 0.04 | 0.04 | 0.04 | 0.04 |
| $Fe_2O_3$ | 0.00 | 0.00 | 0.00 | 0.00 |
| Cl | 0.00 | 0.00 | 0.00 | 0.00 |
| Au | 0.0001 | $8.3 \times 10^{-6}$ | $7.7 \times 10^{-6}$ | $8.0 \times 10^{-6}$ |
| $R_2O$ | 15.04 | 15.40 | 15.31 | 15.25 |
| $R_2O-Al_2O_3$ | 1.90 | 1.01 | 1.03 | 2.12 |
| $5.72*Al_2O_3-$<br>$21.4*ZnO-$<br>$2.5*P_2O_5-35*Li_2O-$<br>$16.6*B_2O_3-$<br>$20.5*MgO-$<br>$23.3*Na_2O-$ | −468.03 | −503.30 | −475.27 | −473.20 |

TABLE 1-continued 27.9*SrO—18.5*K$_2$O—26.3*CaO

Referring now to Table 2, example glass articles A1-A52 having were formed from example compositions C2-C9 and C15-C23 shown in Table 1 and were subjected to heat treatment at the temperature and for the period of time shown in Table 2. The transmittance color coordinate in the CIELAB color space, as measured at an article thickness of 1.33 mm under F2 illumination and a 10° standard observer angle, and the observable color of the resultant colored glass articles are shown in Table 2.

TABLE 2

| Glass Article | A1 | A2 | A3 | A4 | A5 | A6 |
|---|---|---|---|---|---|---|
| Composition | C18 | C19 | C20 | C21 | C22 | C23 |
| Heat treatment temp. (° C.) | 550 | 550 | 550 | 550 | 550 | 550 |
| Heat treatment time (hr.) | 8 | 8 | 8 | 8 | 8 | 8 |
| L* | 87.39 | 88.12 | 86.98 | 86.12 | 91.39 | 96.68 |
| a* | 7.72 | 7.34 | 8.39 | 9.23 | 4.78 | 0.00 |
| b* | 1.87 | 4.93 | 8.07 | 9.58 | 3.81 | 0.80 |
| Observable color | orange | orange | orange | orange | orange | light yellow |

| Glass Article | A7 | A8 | A9 | A10 | A11 | A12 |
|---|---|---|---|---|---|---|
| Composition | C15 | C16 | C17 | C18 | C18 | C19 |
| Heat treatment temp. (° C.) | 575 | 575 | 575 | 575 | 575 | 575 |
| Heat treatment time (hr.) | 2 | 2 | 2 | 8 | 2 | 8 |
| L* | 83.48 | 92.46 | 85.94 | 88.08 | 91.19 | 88.2 |
| a* | 0.19 | 0.98 | 1.68 | 8.15 | 3.07 | 7.80 |
| b* | −6.06 | −0.93 | −4.63 | 5.71 | −0.47 | 6.51 |
| Observable color | blue | purple | purple | orange | pink | orange |

| Glass Article | A13 | A14 | A15 | A16 | A17 | A18 |
|---|---|---|---|---|---|---|
| Composition | C19 | C20 | C20 | C21 | C22 | C22 |
| Heat treatment temp. (° C.) | 575 | 575 | 575 | 575 | 575 | 575 |
| Heat treatment time (hr.) | 2 | 8 | 2 | 8 | 8 | 2 |
| L* | 89.96 | 86.7 | 86.9 | 85.72 | 90.59 | 90.98 |
| a* | 4.42 | 8.49 | 8.50 | 8.98 | 5.51 | 4.33 |
| b* | −0.06 | 9.06 | 6.59 | 10.40 | 4.77 | 1.19 |
| Observable color | pink | orange | orange | orange | orange | red |

| Glass Article | A19 | A20 | A21 | A22 | A23 | A24 |
|---|---|---|---|---|---|---|
| Composition | C23 | C23 | C15 | C16 | C17 | C18 |
| Heat treatment temp. (° C.) | 575 | 575 | 600 | 600 | 600 | 600 |
| Heat treatment time (hr.) | 2 | 8 | 2 | 2 | 2 | 2 |
| L* | 96.73 | 95.89 | 82.63 | 83 | 83.43 | 88.03 |
| a* | 0.03 | 0.63 | 3.35 | 4.27 | 5.48 | 8.35 |
| b* | 0.75 | 1.84 | −6.62 | −6.11 | −5.49 | 4.10 |
| Observable color | yellow | peach | purple | purple | purple | orange |

| Glass Article | A25 | A26 | A27 | A28 | A29 | A30 |
|---|---|---|---|---|---|---|
| Composition | C19 | C20 | C22 | C23 | C2 | C3 |
| Heat treatment temp. (° C.) | 600 | 600 | 600 | 600 | 625 | 625 |
| Heat treatment time (hr.) | 2 | 2 | 2 | 2 | 2 | 2 |
| L* | 87.99 | 86.66 | 90.23 | 96.4 | 89.29 | 87.6 |
| a* | 8.34 | 8.91 | 5.53 | 0.28 | 5.14 | 7.22 |
| b* | 5.45 | 8.48 | 3.52 | 1.24 | 9.97 | 10.51 |
| Observable color | orange | orange | orange | light orange | orange | red |

| Glass Article | A31 | A32 | A33 | A34 | A35 | A36 |
|---|---|---|---|---|---|---|
| Composition | C4 | C5 | C6 | C7 | C8 | C9 |
| Heat treatment temp. (° C.) | 625 | 625 | 625 | 625 | 625 | 625 |

TABLE 2-continued

| Glass Article | | | | | | |
|---|---|---|---|---|---|---|
| Heat treatment time (hr.) | 2 | 2 | 2 | 2 | 2 | 2 |
| L* | 83 | 86.74 | 88.94 | 87.28 | 78.03 | 80.49 |
| a* | 11.39 | 9.76 | 6.92 | 9.09 | 5.04 | 6.25 |
| b* | 2.59 | 2.60 | 4.75 | 3.44 | −9.39 | −8.92 |
| Observable color | red | red | red | red | purple | purple |

| Glass Article | A37 | A38 | A39 | A40 | A41 | A42 |
|---|---|---|---|---|---|---|
| Composition | C15 | C16 | C17 | C18 | C19 | C20 |
| Heat treatment temp. (° C.) | 625 | 625 | 625 | 625 | 625 | 625 |
| Heat treatment time (hr.) | 2 | 2 | 2 | 2 | 2 | 2 |
| L* | 84.25 | 85.21 | 85.58 | 87.5 | 87.39 | 86.09 |
| a* | 10.89 | 10.87 | 10.81 | 8.98 | 8.76 | 9.27 |
| b* | −0.89 | 0.55 | 0.90 | 4.56 | 5.39 | 8.00 |
| Observable color | magenta | red | red | orange | orange | orange |

| Glass Article | A43 | A44 | A45 | A46 | A47 | A48 |
|---|---|---|---|---|---|---|
| Composition | C22 | C23 | C15 | C16 | C17 | C18 |
| Heat treatment temp. (° C.) | 625 | 625 | 650 | 650 | 650 | 650 |
| Heat treatment time (hr.) | 2 | 2 | 2 | 2 | 2 | 2 |
| L* | 90.31 | 95.7 | 84.63 | 85.69 | 86.23 | 87.42 |
| a* | 5.73 | 0.89 | 11.19 | 11.18 | 10.85 | 9.14 |
| b* | 3.85 | 1.49 | −0.12 | 1.22 | 1.47 | 4.40 |
| Observable color | orange | orange | magenta | red | red | orange |

| Glass Article | A49 | A50 | A51 | A52 |
|---|---|---|---|---|
| Composition | C19 | C20 | C22 | C23 |
| Heat treatment temp. (° C.) | 650 | 650 | 650 | 650 |
| Heat treatment time (hr.) | 2 | 2 | 2 | 2 |
| L* | 87.42 | 86.18 | 90.14 | 95.53 |
| a* | 8.84 | 9.28 | 6.00 | 1.04 |
| b* | 5.24 | 8.10 | 3.89 | 1.42 |
| Observable color | orange | orange | orange | orange |

Referring now to Table 3, example glass articles A53-A114 were formed from example compositions C1-C14 and C24-C26 shown in Table 1 and were subjected to heat treatment at the temperature and for the period of time shown in Table 3. The observable colors of the resultant colored glass articles are shown in Table 3.

TABLE 3

| Glass Article | A53 | A54 | A55 | A56 | A57 | A58 |
|---|---|---|---|---|---|---|
| Composition | C1 | C2 | C3 | C4 | C5 | C6 |
| Heat treatment temp. (° C.) | 550 | 550 | 550 | 550 | 550 | 550 |
| Heat treatment time (hr.) | 2 | 2 | 2 | 2 | 2 | 2 |
| Observable color | red | clear, red | clear, red | clear | clear | red |

| Glass Article | A59 | A60 | A61 | A62 | A63 | A64 |
|---|---|---|---|---|---|---|
| Composition | C7 | C8 | C9 | C10 | C11 | C12 |
| Heat treatment temp. (° C.) | 550 | 550 | 550 | 550 | 550 | 550 |
| Heat treatment time (hr.) | 2 | 2 | 2 | 2 | 2 | 2 |
| Observable color | red | clear | clear, pink | clear | clear | clear |

| Glass Article | A65 | A66 | A67 | A68 | A69 | A70 |
|---|---|---|---|---|---|---|
| Composition | C13 | C14 | C24 | C1 | C2 | C3 |
| Heat treatment temp. (° C.) | 550 | 550 | 550 | 575 | 575 | 575 |
| Heat treatment time (hr.) | 2 | 2 | 8 | 2 | 2 | 2 |
| Observable color | clear | clear, purple | purple | orange | orange | red |

| Glass Article | A71 | A72 | A73 | A74 | A75 | A76 |
|---|---|---|---|---|---|---|
| Composition | C4 | C5 | C6 | C7 | C8 | C9 |
| Heat treatment temp. (° C.) | 575 | 575 | 575 | 575 | 575 | 575 |
| Heat treatment time (hr.) | 2 | 2 | 2 | 2 | 2 | 2 |
| Observable color | purple | purple | red | red | clear, red | clear, pink |

| Glass Article | A77 | A78 | A79 | A80 | A81 | A82 |
|---|---|---|---|---|---|---|
| Composition | C10 | C11 | C12 | C13 | C14 | C24 |
| Heat treatment temp. (° C.) | 575 | 575 | 575 | 575 | 575 | 575 |
| Heat treatment time (hr.) | 2 | 2 | 2 | 2 | 2 | 2 |
| Observable color | clear, purple | clear, purple | clear, purple | clear, purple | clear, red | purple |

| Glass Article | A83 | A84 | A85 | A86 | A87 | A88 |
|---|---|---|---|---|---|---|
| Composition | C25 | C26 | C24 | C25 | C1 | C2 |
| Heat treatment temp. (° C.) | 575 | 575 | 575 | 575 | 600 | 600 |

TABLE 3-continued

| Heat treatment time (hr.) | 2 | 2 | 8 | 8 | 2 | 2 |
|---|---|---|---|---|---|---|
| Observable color | purple | red | red | red | orange | orange |
| Glass Article | A89 | A90 | A91 | A92 | A93 | A94 |
| Composition | C3 | C4 | C5 | C6 | C7 | C8 |
| Heat treatment temp. (° C.) | 600 | 600 | 600 | 600 | 600 | 600 |
| Heat treatment time (hr.) | 2 | 2 | 2 | 2 | 2 | 2 |
| Observable color | red | purple | purple | red | red | purple |
| Glass Article | A95 | A96 | A97 | A98 | A99 | A100 |
| Composition | C9 | C10 | C11 | C12 | C13 | C14 |
| Heat treatment temp. (° C.) | 600 | 600 | 600 | 600 | 600 | 600 |
| Heat treatment time (hr.) | 2 | 2 | 2 | 2 | 2 | 2 |
| Observable color | purple | purple | purple | purple | purple | orange |
| Glass Article | A101 | A102 | A103 | A104 | A105 | A106 |
| Composition | C24 | C25 | C26 | C24 | C25 | C26 |
| Heat treatment temp. (° C.) | 600 | 600 | 600 | 625 | 625 | 625 |
| Heat treatment time (hr.) | 2 | 2 | 2 | 2 | 2 | 2 |
| Observable color | purple | red | red | red | red | red |
| Glass Article | A107 | A108 | A109 | A110 | | |
| Composition | C10 | C11 | C12 | C13 | | |
| Heat treatment temp. (° C.) | 650 | 650 | 650 | 650 | | |
| Heat treatment time (hr.) | 2 | 2 | 2 | 2 | | |
| Observable color | purple | purple | clear, purple | purple | | |
| Glass Article | A111 | A112 | A113 | A114 | | |
| Composition | C14 | C24 | C25 | C26 | | |
| Heat treatment temp. (° C.) | 650 | 650 | 650 | 650 | | |
| Heat treatment time (hr.) | 2 | 2 | 2 | 2 | | |
| Observable color | orange | red | red | red | | |

Figure 3:
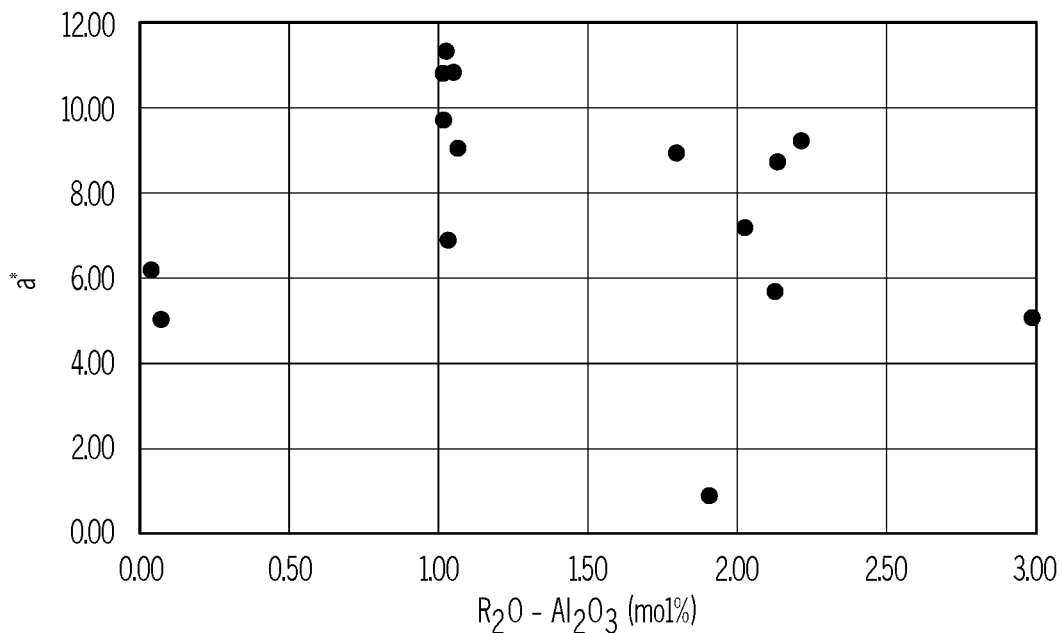
FIG. 3 is a plot of $R_2O$—$Al_2O_3$ vs. a* CIELAB space (x-axis: $R_2O$—$Al_2O_3$; y-axis: a*) of colored glass articles made from glass compositions and subjected to a heat treatment according to one or more embodiments described herein.
Figure 4:
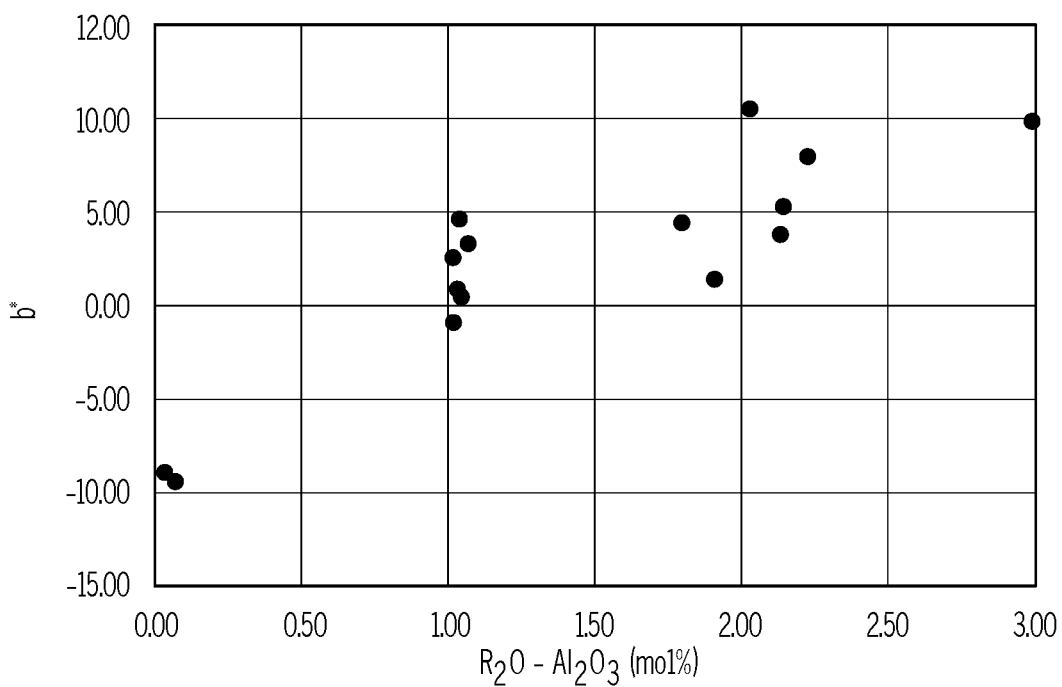
FIG. 4 is a plot of $R_2O$—$Al_2O_3$ vs. b* CIELAB space (x-axis: $R_2O$—$Al_2O_3$; y-axis: b*) of colored glass articles made from glass compositions and subjected to a heat treatment according to one or more embodiments described herein.

Referring now to FIGS. 3 and 4, plots show the relationship of $R_2O-Al_2O_3$ and a* and b*, respectively, of example glass articles A29-A44. As shown in FIG. 3, a* was a positive number, regardless of the $R_2O-Al_2O_3$ value, thereby resulting in observable colors towards red side of the CIELAB color space. As shown in FIG. 4, as $R_2O-Al_2O_3$ increased, b* increased, thereby shifting the observable colors from blue to yellow. For example, example glass articles A35 and A36, formed from example compositions C8 and C9 having an analyzed $R_2O-Al_2O_3$ of 0.07 mol % and 0.04 mol %, respectively, had a b* of −9.39 and −8.92, respectively, resulting in observably purple glass articles. Example glass articles A29 and A30, formed from example glass compositions C2 and C3 having an analyzed $R_2O-Al_2O_3$ of 2.98 mol % and 2.02 mol %, respectively, had a b* of 9.97 and 10.51, respectively, resulting in an observably orange glass article and an observably red glass article.

Moreover, example glass articles A33 and A34, formed from example glass compositions C6 and C7 including $Fe_2O_3$ and $ZrO_2$, respectively, had an observable red color.

As indicated by Tables 2 and 3 and FIGS. 3 and 4, the analyzed $R_2O-Al_2O_3$ may be adjusted, additional components may be added to the glass composition, and the glass article may be subjected to a certain heat treatment to provide a desired colored glass article.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass composition comprising:
    greater than or equal to 50 mol % and less than or equal to 80 mol % $SiO_2$;
    greater than or equal to 7 mol % and less than or equal to 25 mol % $Al_2O_3$;
    greater than or equal to 1 mol % and less than or equal to 15 mol % $B_2O_3$;
    greater than or equal to 7 mol % and less than or equal to 20 mol % $Li_2O$;
    greater than or equal to 0.5 mol % and less than or equal to 12 mol % $Na_2O$;
    greater than 0 mol % and less than or equal to 1 mol % $K_2O$; and
    greater than or equal to $1\times10^{-6}$ mol % and less than or equal to 0.0016 mol % Au, wherein:
    $R_2O-Al_2O_3$ is greater than or equal to −5 mol % and less than or equal to 5 mol %, $R_2O$ being the sum of $Li_2O$, $Na_2O$, and $K_2O$.

2. The glass composition of claim 1, wherein $R_2O-Al_2O_3$ is greater than or equal to −3 mol % and less than or equal to 5 mol %.

3. The glass composition of claim 1, wherein the glass composition comprises greater than or equal to 0.0001 mol % and less than or equal to 0.001 mol % Au.

4. The glass composition of claim 1, wherein $R_2O$ is greater than or equal to 6 mol % and less than or equal to 25 mol %.

5. The glass composition of claim 1, wherein the glass composition comprises greater than or equal to 0.01 mol % and less than or equal to 2 mol % $ZrO_2$.

6. The glass composition of claim 1, wherein 5.72*$Al_2O_3$ (mol %)−21.4*ZnO (mol %)−2.5*$P_2O_5$ (mol %)−35*$Li_2O$ (mol %)−16.6*$B_2O_3$ (mol %)−20.5*MgO (mol %)−23.3*$Na_2O$ (mol %)−27.9*SrO (mol %)−18.5*$K_2O$ (mol %)−26.3*CaO (mol %) is greater than −609 mol %.

7. The glass composition of claim 1, wherein the glass composition comprises greater than or equal to 0.01 mol % and less than or equal to 1 mol % $SnO_2$.

8. The glass composition of claim 1, wherein the glass composition comprises greater than or equal to 7 mol % and less than or equal to 18 mol % $Li_2O$.

9. The glass composition of claim 1, wherein the glass composition comprises greater than or equal to 1 mol % and less than or equal to 12 mol % $Na_2O$.

10. The glass composition of claim 1, wherein the glass composition comprises greater than or equal to 0.1 mol % and less than or equal to 0.5 mol % $K_2O$.

11. The glass composition of claim 1, wherein the glass composition comprises greater than or equal to 2 mol % and less than or equal to 12 mol % $B_2O_3$.

12. A colored glass article comprising the glass composition of claim 1.

13. The colored glass article of claim 12, wherein the colored glass article has a transmittance color coordinate in the CIELAB color space, as measured at an article thickness of 1.33 mm under F2 illumination and a 100 standard observer angle, of:
L* greater than or equal to 50 and less than or equal to 100;
a* greater than or equal to −15 and less than or equal to 25; and
b* greater than or equal to −25 and less than or equal to 25.

14. The colored glass article of claim 12, wherein the colored glass article has a thickness greater than or equal to 250 μm and less than or equal to 6 mm.

15. The colored glass article of claim 12, wherein the colored glass article is an ion-exchanged colored glass article.

16. The colored glass article of claim 15, wherein the ion-exchanged colored glass article has a depth of compression 10 μm or greater.

17. The colored glass article of claim 15, wherein the ion-exchanged colored glass article has a surface compressive stress greater than or equal to 300 MPa.

18. The colored glass article of claim 15, wherein the ion-exchanged colored glass article has a maximum central tension greater than or equal to 40 MPa.

19. A consumer electronic device, comprising:
a housing having a front surface, a back surface, and side surfaces; and
electrical components provided at least partially within the housing, the electrical components including at least a controller, a memory, and a display, the display being provided at or adjacent the front surface of the housing;
wherein the housing comprises the colored glass article of claim 15.

20. A method of heat treating the glass composition of claim 1, the method comprising:
heat treating the glass composition to form a glass article,
subjecting the glass article to a heat treatment cycle at a temperature greater than or equal to 500° C. and less than or equal to 800° C. and a duration greater than or equal to 0.25 hour and less than or equal to 24 hours to produced the colored glass article.

* * * * *

UNITED STATES PATENT AND TRADEMARK OFFICE
CERTIFICATE OF CORRECTION

PATENT NO. : 11,560,329 B1
APPLICATION NO. : 17/677375
DATED : January 24, 2023
INVENTOR(S) : Xiaoju Guo et al.

It is certified that error appears in the above-identified patent and that said Letters Patent is hereby corrected as shown below:

In the Claims

In Column 37, Line 4, in Claim 13, delete "100" and insert -- 10° --.

Signed and Sealed this
Twenty-fifth Day of June, 2024

Katherine Kelly Vidal
*Director of the United States Patent and Trademark Office*